United States Patent
Hagiwara

(10) Patent No.: US 10,386,606 B2
(45) Date of Patent: Aug. 20, 2019

(54) ZOOM LENS AND IMAGING DEVICE

(71) Applicant: Samsung Electronics Co., Ltd., Suwon-si, Gyeonggi-do (KR)

(72) Inventor: Hiroyuki Hagiwara, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/548,988

(22) PCT Filed: Jan. 18, 2016

(86) PCT No.: PCT/KR2016/000489
§ 371 (c)(1),
(2) Date: Aug. 4, 2017

(87) PCT Pub. No.: WO2016/140433
PCT Pub. Date: Sep. 9, 2016

(65) Prior Publication Data
US 2018/0045915 A1   Feb. 15, 2018

(30) Foreign Application Priority Data

Mar. 4, 2015   (JP) .................... 2015-042901
Jan. 8, 2016   (KR) .................. 10-2016-0002588

(51) Int. Cl.
*G02B 9/64* (2006.01)
*G02B 13/00* (2006.01)
(Continued)

(52) U.S. Cl.
CPC .......... *G02B 13/0045* (2013.01); *G02B 9/64* (2013.01); *G02B 13/009* (2013.01); *G02B 13/02* (2013.01);
(Continued)

(58) Field of Classification Search
CPC .... G02B 15/177; G02B 15/14; G02B 13/009; G02B 15/173; G02B 15/161; G02B 13/18;
(Continued)

(56) References Cited

U.S. PATENT DOCUMENTS 5,719,708 A   2/1998   Nagaoka
7,009,780 B2   3/2006   Ishii
(Continued)

FOREIGN PATENT DOCUMENTS

EP   2 056 152 A2   5/2009
JP   58-202418 A   5/1985
(Continued)

OTHER PUBLICATIONS

JP Office Action dated Nov. 5, 2018 issued in JP Application No. 2015-042901.

*Primary Examiner* — Evan P Dzierzynski
*Assistant Examiner* — Sharrief I Broome
(74) *Attorney, Agent, or Firm* — Jefferson IP Law, LLP

(57) ABSTRACT

Provided is a zoom lens that may achieve satisfactory optical performance from a wide angle position to a telephoto position and may be miniaturized. The zoom lens includes a first lens group having a positive refractive power, a second lens group having a negative refractive power, and a subsequent group including a plurality of lens groups and having a positive refractive power, wherein the first lens group, the second lens group, and the subsequent group are sequentially arranged from an object side. Since an image plane lens group located closest to an image plane side has a zooming function, a total length of the zoom lens may be reduced.

20 Claims, 30 Drawing Sheets

(51) Int. Cl.
*G02B 13/02* (2006.01)
*G02B 13/18* (2006.01)
*G02B 15/16* (2006.01)
*G02B 15/173* (2006.01)

(52) U.S. Cl.
CPC .......... *G02B 13/18* (2013.01); *G02B 15/161* (2013.01); *G02B 15/173* (2013.01)

(58) Field of Classification Search
CPC ...................... G02B 27/646; G02B 13/0045; G02B 15/163; G02B 15/20; G02B 15/16; G02B 7/102; G02B 9/64; G02B 13/0065; G02B 13/04; G02B 13/16; G02B 15/22
See application file for complete search history.

(56) References Cited

U.S. PATENT DOCUMENTS

| | | |
|---|---|---|
| 7,301,711 B2 | 11/2007 | Saori |
| 7,672,063 B2 | 3/2010 | Take |
| 8,736,971 B2 | 5/2014 | Hatada |
| 8,760,771 B2 | 6/2014 | Sugita |
| 8,810,918 B2 | 8/2014 | Li |
| 9,025,035 B2 | 5/2015 | Yamamoto et al. |
| 2013/0027585 A1 | 1/2013 | Souma |
| 2013/0258130 A1* | 10/2013 | Mihara .................. G02B 15/14 348/222.1 |
| 2014/0313395 A1 | 10/2014 | Lee |

FOREIGN PATENT DOCUMENTS

| | | |
|---|---|---|
| JP | 2004-341060 A | 12/2004 |
| JP | 2007-127989 A | 5/2007 |
| JP | 2009-115874 A | 5/2009 |
| JP | 2011-203293 A | 10/2011 |
| JP | 2012-123156 A | 6/2012 |
| JP | 2012-225987 A | 11/2012 |
| JP | 2013015778 A | 1/2013 |
| JP | 2013-024936 A | 2/2013 |
| JP | 2013-044795 A | 3/2013 |
| JP | 2013083930 A | 5/2013 |
| JP | 2013-160944 A | 8/2013 |
| JP | 2015014678 A | 1/2015 |
| KR | 10-2010-0010378 A | 2/2010 |
| KR | 10-2014-0125680 A | 10/2014 |
| WO | 2012/121014 A1 | 9/2012 |

\* cited by examiner

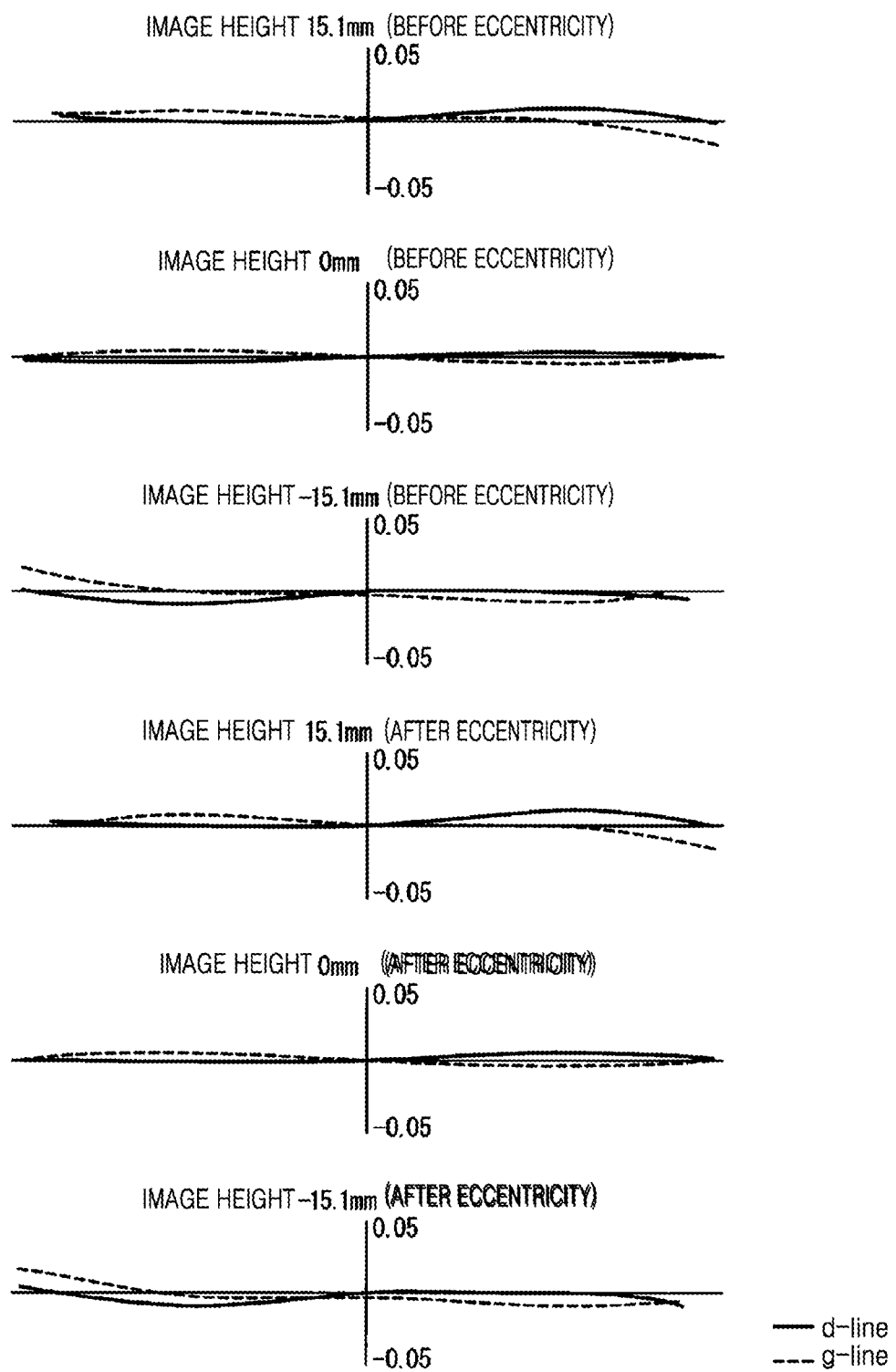

ZOOM LENS AND IMAGING DEVICE

TECHNICAL FIELD

The present disclosure relates to a zoom lens and an imaging device.

BACKGROUND ART

Zoom lenses may be classified into positive-lead-type zoom lenses, in which lens groups located closest to object sides have positive refractive powers, and negative-lead-type zoom lenses, in which lens groups closest to object sides have negative powers.

Positive-lead-type zoom lenses have shorter total lengths, smaller lens diameters, and higher magnification than negative-lead-type zoom lenses. As positive-lead-type zoom lenses, zoom lenses having multi-group structures including a plurality of lens groups have been proposed in order to achieve high optical performance from wide angle positions to telephoto positions. From among zoom lenses having multi-group structures, a zoom lens that is often used has a multi-group structure including a first lens group having a positive refractive power as a whole, a second lens group having a negative refractive power as a whole, and a subsequent group having a positive refractive power as a whole, wherein the first lens group, the second lens group, and the subsequent group are sequentially arranged from an object side. In order to ensure high optical performance in such a zoom lens, a structure in which a movable lens group is located closest to an image plane side is suggested.

DETAILED DESCRIPTION OF THE INVENTION

Technical Problem

The present disclosure provides a zoom lens that may reduce a total length and may improve optical performance.

Technical Solution

A zoom lens according to an embodiment of the present invention includes: a first lens group having a positive refractive power; a second lens group having a negative refractive power; and a subsequent group including a stop and a plurality of lens groups, and having a positive refractive power, wherein the first lens group, the second lens group, and the subsequent group are sequentially arranged from an object side, wherein an image plane lens group located closest to an image plane side from among the plurality of lens groups included in the subsequent group moves along an optical axis during zooming from a wide angle position to a telephoto position and includes at least two positive lenses and at least two negative lenses, and the zoom lens satisfies the following formula:

$$1.0 < f_r/f_w < 2.4$$

where $f_r$ denotes a focal length of the image plane lens group and $f_w$ denotes a focal length of the zoom lens at the wide angle position.

Advantageous Effects of the Invention

A zoom lens of the present disclosure may achieve satisfactory optical performance from a wide angle position to a telephoto position, and may reduce a total length of the zoom lens by allowing a lens group located closest to an image plane side to have a zooming function. According to types of lenses constituting a lens group, aberration of the zoom lens may be corrected and a ghost may be suppressed.

DESCRIPTION OF THE DRAWINGS

FIG. 4A illustrates lateral aberration at the wide angle position W in the zoom lens of the first numerical embodiment.

BEST MODE

Figure 1:
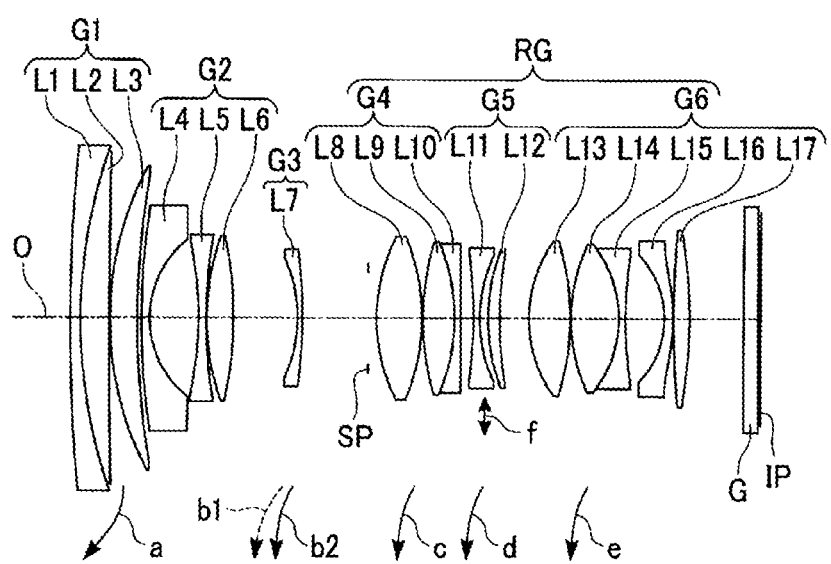
FIG. 1 illustrates a configuration of a zoom lens according to an example embodiment.

A zoom lens according to an embodiment of the present invention includes: a first lens group having a positive refractive power; a second lens group having a negative refractive power; and a subsequent group including a stop and a plurality of lens groups and having a positive refractive power, wherein the first lens group, the second lens group, and the subsequent group are sequentially arranged from an object side, wherein an image plane lens group located closest to an image plane side from among the plurality of lens groups included in the subsequent group moves along an optical axis during zooming from a wide angle position to a telephoto position and includes at least two positive lenses and at least two negative lenses, and the zoom lens satisfies Formula 1:

$$1.0 < f_r/f_w < 2.4 \qquad (1)$$

where $f_r$ denotes a focal length of the image plane lens group and $f_w$ denotes a focal length of the zoom lens at the wide angle position.

The image plane lens group may include a first positive lens having two convex surfaces, a second positive lens having two convex surfaces, a negative lens having two concave surfaces, a negative lens having a shape convex toward the image plane side, and a positive lens having a shape convex toward the image plane side, wherein the first positive lens, the second positive lens, the negative lens having two concave surfaces, the negative lens having a shape convex toward the image plane side, and the positive lens are sequentially arranged from the object side.

At least one surface of any one of lenses constituting the image plane lens group may be an aspherical surface.

The second positive lens and the negative lens having two concave surfaces may be cemented together to form a double lens.

When an amount of movement of the image plane lens group from the wide angle position to the telephoto position during zooming is $dr_{W-T}$ and a focal length of the zoom lens at the wide angle position is $f_w$, the zoom lens may satisfy Formula 2:

$$0.6 < dr_{W-T}/f_w < 1.5 \qquad (2).$$

When an Abbe number of the first positive lens at a d-line (587.56 nm) is $v_{r1}$, a focal length of the first positive lens is $f_{r1}$, and a focal length of the image plane lens group is $f_r$, the zoom lens may satisfy Formulae 3 and 4:

$$60 < v_{r1} \qquad (3)$$

$$0.4 < f_{r1}/f_r < 1.4 \qquad (4).$$

When a lens of the image plane lens group that is located closest to the image plane side is a positive lens having a shape convex toward the image plane side, a refractive index of the positive lens located closest to the image plane side at a d-line (587.56 nm) is $N_{rp}$, a paraxial radius of curvature of an object side surface of the positive lens located closest to the image plane side is $r_{rp1}$, and a paraxial radius of curvature of an image side surface of the positive lens located closest to the image plane side is $r_{rp2}$, the zoom lens may satisfy Formulae 5 and 6:

$$1.8 < N_{rp} \qquad (5)$$

$$0.0 < (r_{rp1} + r_{rp2})/(r_{rp} - r_{rp2}) < 5.0 \qquad (6).$$

A lens group located closest to the object side from among the plurality of lens groups constituting the subsequent group may be located closer to the object side than the stop, has a negative refractive power, and may move along the optical axis during focusing.

The second lens group may have a largest negative refractive power in the zoom lens and may be fixed during zooming from the wide angle position to the telephoto position.

The subsequent group may include a third lens group having a negative refractive power, a fourth lens group having a positive refractive power, a fifth lens group having a negative refractive power, and the image plane lens group having a positive refractive power, wherein the third lens group, the fourth lens group, the fifth lens group, and the image plane lens group are sequentially arranged from the object side.

When a focal length of the third lens group is $f_3$ and a focal length of the zoom lens at the wide angle position is $f_w$, the zoom lens may satisfy Formula 7:

$$2.0 < |f_3/f_w| < 4.0 \qquad (7).$$

The third lens group may include one negative lens having a meniscus shape convex toward the image plane side, and when a thickness of the lens of the third lens group along the optical axis is $d_3$ and a focal length of the zoom lens at the wide angle position is $f_w$, the zoom lens may satisfy Formula 8:

$$0.02 < d_3/f_w < 0.07 \qquad (8).$$

At least one surface of any one of lenses constituting the second lens group may be an aspherical surface, and when a focal length of the second lens group is $f_2$, a focal length of the third lens group is $f_3$, and a focal length of the zoom lens at the wide angle position is $f_w$, the zoom lens may satisfy Formulae 9 and 10:

$$1.2 < |f_2/f_w| < 2.4 \qquad (9)$$

$$0.5 < f_2/f_3 < 1.2 \qquad (10).$$

The first lens group may include at least one positive lens and at least one negative lens, and when a focal length of the first lens group is $f_1$ and a focal length of the zoom lens at the telephoto position is $f_t$, the zoom lens may satisfy Formula 11:

$$1.0 < f_1/f_t < 4.0 \qquad (11).$$

The fifth lens group may include at least one positive lens and at least one negative lens, blur may be corrected by moving the fifth lens group within a plane intersecting the optical axis, and when a focal length of the fifth lens group is $f_5$ and a focal length of the zoom lens at the telephoto position is $f_t$, the zoom lens may satisfy Formula 12:

$$0.2 < |f_5/f_t| < 2.0 \qquad (12).$$

The fourth lens group may include at least one positive lens and at least one negative lens, at least one surface of any one of lenses constituting the fourth lens group may be an aspherical surface, and when a focal length of the fourth lens group is $f_4$ and a focal length of the zoom lens at the telephoto position is $f_t$, the zoom lens may satisfy Formula 13:

$$0.2 < f_4/f_t < 0.6 \qquad (13).$$

A zoom lens according to another embodiment of the present invention includes a first lens group having a positive refractive power as a whole; a second lens group having a negative refractive power as a whole; and a subsequent group including a stop and a plurality of lens groups having a positive refractive power as a whole, wherein the first lens group, the second lens group, and the subsequent group are sequentially arranged from an object side, wherein zooming is performed by changing an air gap between lens groups, wherein an image plane lens group located closest to an image plane side from among the plurality of lens groups constituting the subsequent group moves along an optical axis during zooming from a wide angle position to a telephoto position and includes two positive lenses having two convex surfaces, a negative lens having two concave surfaces, a negative lens having a shape convex toward the image plane side, and a positive lens having a shape convex toward the image plane side, wherein at least one surface of any one of lenses constituting the image plane lens group located closest to the image plane side is an aspherical surface.

The zoom lens may satisfy Formula 14:

$$1.0 < f_r/f_w < 2.4 \qquad (14)$$

where $f_r$ denotes a focal length of the image plane lens group and $f_w$ denotes a focal length of the zoom lens at the wide angle position.

The subsequent group may include a third lens group having a negative refractive power, a fourth lens group having a positive refractive power, a fifth lens group having a negative refractive power, and the image plane lens group having a positive refractive power, wherein the third lens group, the fourth lens group, the fifth lens group, and the image plane lens group are sequentially arranged from the object side.

An imaging device according to an embodiment of the present invention includes: the zoom lens; and a solid-state imaging device configured to capture an image formed by the zoom lens.

MODE OF THE INVENTION

A zoom lens and an imaging device will now be described in detail with reference to the accompanying drawings. Lens data and the like in the following description are merely examples, and thus the present invention is not limited thereto and appropriate changes may be made without departing from the spirit of the present invention.

In the following description, the term "image plane" may refer to a surface on which an image is formed after passing through a group of lenses, and the term "image plane side" may refer to a side at which an image sensor, an optical block, etc. are located. An "object side" and an "image plane side" of a zoom lens may be opposite sides. For example, when a "lens group is located closest to an image plane side", the lens group may be a lens group located closest to a plane on which an image is formed, such as an imaging surface of an image sensor, from among a plurality of lens groups constituting a zoom lens. Also, when a "lens group is located closest to an object side", the lens group may be a lens group located closest to an object side from among a plurality of lens groups constituting a zoom lens group. Accordingly, in a plurality of lens groups constituting a zoom lens group, when a side through which light enters is a front side and a side through which light exits is a rear side, an object side may correspond to the front side and an image plane side may correspond to the rear side. Also, from among two surfaces of a lens, a surface facing an object side may be referred to as an object side surface and another surface facing an image plane side may be referred to as an image side surface.

FIG. 1 illustrates a configuration of a zoom lens according to an example embodiment. As shown in FIG. 1, the zoom lens of the present embodiment may be used as, for example, an optical imaging system of an imaging device such as an interchangeable lens system camera, a digital camera, a digital video camera, or a surveillance camera.

The zoom lens of FIG. 1 may include a first lens group G1 having a positive refractive power as a whole, a second lens group G2 having a negative refractive power as a whole, a third lens group G3 having a negative refractive power as a whole, a stop SP, and a subsequent group RG having a positive refractive power as a whole and including one or more lens groups sequentially arranged from an object side.

In the present embodiment, the subsequent group RG may include the third lens G3 having a negative refractive power as a whole, the stop SP, a fourth lens group G4 having a positive refractive power as a whole, a fifth lens group G5 having a negative refractive power as a whole, and an image plane lens group G6 having a positive refractive power as a whole, wherein the third lens group G3, the stop SP, the fourth lens group G4, the fifth lens group G5, and the image plane lens group G6 are sequentially arranged from the object side. That is, the zoom lens of the present embodiment has a 6-group structure including the lens groups G1 through G6 respectively having positive, negative, negative, positive, negative, and positive refractive powers. The image plane lens group G6 may be a lens group located closest to an image plane side from among the lens groups of the subsequent group RG.

The first lens group G1 may include, for example, a negative lens L1 having a meniscus shape convex toward the object side, a positive lens L2 having two convex surfaces, and a positive lens L3 having a meniscus shape convex toward the object side, wherein the negative lens L1, the positive lens L2, and the positive lens L3 are sequentially arranged from the object side.

The second lens group G2 may include a negative lens L4 having a meniscus shape convex to the object side, a negative lens L5 having two concave surfaces, and a positive lens L6 having two convex surfaces, wherein the negative lens L4, the negative lens L5, and the positive lens L6 are sequentially arranged from the object side.

The third lens group G3 may include a negative lens L7 having a meniscus shape convex toward the image plane side.

The fourth lens group G4 may include a positive lens L8 having two convex surfaces, a positive lens L9 having two convex surfaces, and a negative lens L10 having a meniscus shape convex toward the image plane side, wherein the positive lens L8, the positive lens L9, and the negative lens L10 are sequentially arranged from the object side. The positive lens L9 and the negative lens L10 may be cemented together to form a double lens.

The fifth lens group G5 may include a negative lens L11 having two concave surfaces and a positive lens L12 having a meniscus shape convex toward the object side, wherein the negative lens L11 and the positive lens L12 are sequentially arranged from the object side.

The image plane lens group G6 may include a positive lens L13 having two convex surfaces, a positive lens L14 having two convex surfaces, a negative lens L15 having two concave surfaces, a negative lens L16 having a meniscus shape convex toward the image plane side, and a positive lens L17 having two convex surfaces, wherein the positive lens L13, the positive lens L14, the negative lens L15, the negative lens L16, and the positive lens L17 are sequentially arranged from the object side. Also, the positive lens L14 and the negative lens L15 may be cemented together to form a double lens.

The stop SP may limit a diameter (an amount) of a beam incident on an image plane IP from the object side. An optical block G may be located between the image plane IP and the positive lens L17 of the image plane lens group G6. Examples of the optical block G may include an optical filter, a face plate, a correction low pass filter, and an infrared blocking filter.

In an imaging device including the zoom lens of the present embodiment and a solid-state imaging device, the image plane IP may correspond to an imaging surface of the solid-state imaging device. For example, any of various photoelectric conversion elements such as a charge-coupled device (CCD) or complementary metal oxide semiconductor (CMOS) sensor may be used as the solid-state imaging device.

In the imaging device, light incident from the object side of the zoom lens of the present embodiment finally falls onto the imaging surface of the solid-state imaging device. The solid-state imaging device may convert the received light into an electrical signal and may generate a digital image corresponding to an image of a subject. The digital image may be recorded on a recording medium such as a hard disk drive (HDD), a memory card, an optical disk, or a magnetic tape. Also, when the imaging device is a silver halide film camera, the image plane IP may correspond to a film surface.

In the zoom lens of the present embodiment, during zooming from a wide angle position to a telephoto position, air gaps between the lens groups G1 through G6 are changed. That is, the lens groups G1 and G3 through G6 other than the second lens group G2 may be moved along an optical axis O so that an air gap between the first lens group G1 and the second lens group G2, an air gap between the second lens group G2 and the third lens group G3, an air gap between the third lens group G3 and the fourth lens group G4, an air gap between the fourth lens group G4 and the fifth lens group G5, and an air gap between the fifth lens group G5 and the image plane lens group G6 are all changed.

For example, during zooming from the wide angle position to the telephoto position, the first lens group G1 may move from the image plane side to the object side in a direction indicated by an arrow 'a' of FIG. 1. The second lens group G2 may be fixed. The third lens group G3 may move from the image plane side to the object side in a direction indicated by arrows 'b1' and 'b2' of FIG. 1. The fourth lens group G4 may move from the image plane side to the object side in a direction indicated by an arrow 'c' of FIG. 1. The fifth lens group G5 may move from the image plane side to the object side in a direction indicated by an arrow 'd' of FIG. 1. The image plane lens group G6 may move from the image plane side to the object side in a direction indicated by an arrow 'e' of FIG. 1. Also, the stop SP may move integrally with the fourth lens group G4 during zooming.

In the zoom lens of the present embodiment, during focusing from an object at infinity to a nearby object, the third lens group G3 may move from the image plane side to the object side. Also, the arrow 'b1' marked with a dashed line and the arrow 'b2' marked with a solid line in FIG. 1 respectively indicate movement trajectories for correcting the displacement of the image plane IP caused by zooming from the wide angle position to the telephoto position when focusing on the object at infinity and focusing on the object at nearby.

In the zoom lens of the present embodiment, the fifth lens group G5 may move in a direction indicated by an arrow 'f' of FIG. 1 to intersect the optical axis O. For example, the fifth lens group G5 may move in a direction perpendicular to the optical axis O. As the fifth lens G5 moves, an image formed on the image plane IP may be shifted in the direction perpendicular to the optical axis O, thereby optically correcting blur caused by a vibration such as a hand shake.

Also, if a lens is to be moved in the direction perpendicular to the optical axis O during correction of blur and an adequate amount of movement is secured to shift the image formed on the image plane IP in the direction perpendicular to the optical axis O, blur may be corrected even when a shift direction is misaligned from the direction perpendicular to the optical axis O.

First Embodiment

In a zoom lens according to a first embodiment, the image plane lens group G6 located closest to the image plane side from among the plurality of lens groups constituting the subsequent group moves along the optical axis O during zooming from the wide angle position to the telephoto position and is a lens group having a largest amount of movement during zooming.

Also, the image plane lens group G6 includes two positive lenses L13 and L14 each having two convex surfaces, the negative lens L15 having two concave surfaces, the negative lens L16 having a shape convex toward the image plane side, and the positive lens L17 having a shape convex toward the image plane side, and at least one surface of any one of the lenses L13 through L17 is an aspherical surface. For example, in the present embodiment, two surfaces of the negative lens L16 may be aspherical surfaces.

In the zoom lens according to the first embodiment, a length of the zoom lens may be reduced by implementing a zooming function in the image plane lens group G6 having a largest amount of movement during zooming from among the lens groups G4 through G6 located closer to the image plane side than the stop SP. The zoom lens may have a zoom ratio of about 3 and a relatively large aperture value of about f2.8. Positive refractive powers may be distributed and all aberration may be satisfactorily corrected implementing the image plane lens group G6 so as to include a plurality of positive lenses having relatively large positive refractive powers, for example, the positive lenses L13, L14, and L17.

Also, in particular, axial chromatic aberration at the telephoto position may be satisfactorily corrected by using a glass material having a large Abbe number in the two positive lenses L13 and L14 located close to the object side from among the lenses L13 through L17 constituting the image plane lens group G6. For example, a glass material having an Abbe number equal to or greater than 70 may be used in the two positive lenses L13 and L14 located closer to the object side.

Also, axial chromatic aberration may be satisfactorily corrected by arranging the negative lens L15 having two concave surfaces and the negative lens L16 having a shape convex toward the image plane side such that the negative lens L15 and the negative lens L16 are located next to the two positive lenses L13 and L14 and face the image plane side, a small lens diameter may be maintained by using a divergence effect, and high imaging performance even on a peripheral portion of a screen may be ensured.

Also, a ghost or the like, which occurs when a ray reflected from the imaging surface of the solid-state imaging device or the optical filter is re-incident on the imaging surface of the solid-state imaging device due to reflection from a plane, may be suppressed by implementing the positive lens L17 located closest to the image plane side from among the lenses L13 through L17 constituting the image plane lens group G6 with a convex object side surface. An angle of incidence on the image plane IP may be limited due to a convergence effect, and a total length of the zoom lens may be reduced by locating the positive lens L17 closest to the image plane side.

Also, the negative lens L16 having a meniscus shape convex toward the image plane side in the image plane lens group G6 may include an aspherical surface. Accordingly, off-axis aberration may be satisfactorily corrected.

Second Embodiment

In a zoom lens according to a second embodiment, the image plane lens group G6 located closest to the image plane side from among the plurality of lens groups (i.e., the third through fifth lens groups G3-G5 and the image plane lens group G6 in the present embodiment) constituting the subsequent group may move along the optical axis O during zooming from the wide angle position to the telephoto position. Also, the image plane lens group G6 has at least two positive lenses and at least two negative lenses. For example, the image plane lens group G6 may include the positive lenses L13, L14, and L17 and the negative lenses L15 and L16.

Also, in the zoom lens according to the second embodiment, at least one surface of any one of the lenses L14 through L17 constituting the image plane lens group G6 may be an aspherical surface. For example, two surfaces of the negative lens L16 may be aspherical surfaces.

Also, in the zoom lens according to the second embodiment, when a focal length of the image plane lens group G6 is $f_r$ and a focal length of the zoom lens at the wide angle position is $f_w$, the zoom lens may satisfy Formula 1 as follows.

$$1.0 < f_r/f_w < 2.4 \quad (1)$$

In the zoom lens according to the second embodiment, a length of the zoom lens may be reduced by implementing a zooming function in the image plane lens group G6 having a largest amount of movement during zooming from among the lens groups G4 through G6 located closer to the image plane side than the stop SP. The zoom lens may have a zoom ratio of about 3 and a relatively large aperture value of about f2.8. Positive refractive powers may be distributed and all aberration may be satisfactorily corrected by including at least two positive lenses having relatively large positive refractive powers, for example, the positive lenses L13, L14, and L17, in the image plane lens group G6. Also, aberration may be satisfactorily corrected by including at least two negative lenses, for example, the negative lenses L15 and L16, in the image plane lens group G6.

Also, in the zoom lens according to the second embodiment, all axial aberration may be satisfactorily corrected by implementing at least one surface of any one of the lenses L13 through L17 constituting the image plane lens group G6 as an aspherical surface.

Also, in the zoom lens according to the second embodiment, a total length may be reduced and high performance may be achieved by satisfying Formula 1.

For example, Formula 1 may define a focal length of the image plane lens group G6 and a focal length of the zoom lens at the wide angle position. When a refractive power of the image plane lens group G6 is reduced to exceed an upper limit of Formula 1, a converging function of the image plane lens group G6 may be reduced, thereby increasing a back focus and making it difficult to reduce a total length of the zoom lens.

When a refractive power of the image plane lens group G6 is increased to exceed a lower limit of Formula 1, it may be difficult to correct off-axis aberration at the wide angle position.

The zoom lens according to an example embodiment may satisfy Formula 1'.

$$1.8 < f_r/f_w < 2.2 \quad (1)'$$

Also, the zoom lens according to the first embodiment may satisfy Formula 1 and Formula 1', like the zoom lens according to the second embodiment.

In any of the zoom lenses according to the first and second embodiments, the image plane lens group G6 has a largest amount of movement during zooming, and when an amount of movement of the image plane lens group G6 from the wide angle position to the telephoto position during zooming is $dr_{W-T}$ and a focal length of the zoom lens at the wide angle position is $f_w$, the zoom lens may satisfy Formula 2 as follows.

$$0.6 < dr_{W-T}/f_w < 1.5 \quad (2)$$

Formula 2 may define an amount of movement of the image plane lens group G6 from the wide angle position to the telephoto position during zooming and a focal length of the zoom lens at the wide angle position. When an amount of movement of the image plane lens group G6 is increased to exceed an upper limit of Formula 2, a cam shape that restricts the movement may be increased, thereby increasing a total length of the zoom lens.

When an amount of movement of the image plane lens group G6 is reduced so as to exceed a lower limit of Formula 2, a zooming function of the image plane lens group G6 is reduced, thereby making it difficult to satisfy desired zoom magnification while maintaining high optical performance.

For example, any of the zoom lenses according to the first and second embodiments may satisfy Formula 2'.

$$0.7 < dr_{W-T}/f_w < 1.0 \quad (2)'$$

In any of the zoom lenses according to the first and second embodiments, the image plane lens group G6 may include the positive lens L13 having two convex surfaces, a double lens obtained by cementing the positive lens L14 having two convex surfaces and the negative lens L15 having two concave surfaces, the negative lens L16 having a shape convex toward the image plane side, and the positive lens L17 having a shape convex toward the image plane side. Accordingly, axial chromatic aberration from the wide angle position to the telephoto position may be satisfactorily corrected by implementing the positive lens L14 and the negative lens L15 that are cemented together with a chromatic aberration cancelling effect, in consideration of manufacturing characteristics.

Also, in the image plane lens group G6, when an Abbe number of the positive lens L13 located closest to the object side is $v_{r1}$ at a d-line (587.56 nm), a focal length of the positive lens L13 is $f_{r1}$, and a focal length of the image plane lens group G6 is $f_r$, the zoom lens may satisfy Formulae 3 and 4.

$$60 < v_{r1} \quad (3)$$

$$0.4 < f_{r1}/f_r < 1.4 \quad (4)$$

Formula 3 may define an Abbe number, at the d-line (587.56 nm), of the positive lens L13 located closest to the object side in the image plane lens group G6. When a glass material, having an Abbe number that is reduced to exceed a lower limit of Formula 3, is selected, it may be difficult to correct axial chromatic aberration at the telephoto position, and thus it may be difficult to ensure high optical performance.

Formula 4 may define a focal length of the positive lens L13 that is located closest to the object side and a focal length of the image plane lens group G6. When a refractive power of the positive lens is reduced to exceed an upper limit of Formula 4, a convergence effect may be reduced and a lens diameter of each subsequent lens may be increased. As a result, the zoom lens may be expanded in a diameter direction.

When a refractive power of the positive lens is increased to exceed a lower limit of Formula 4, a convergence effect may be excessively increased, thereby making it difficult to correct spherical aberration.

Any of the zoom lenses according to the first and second embodiments may satisfy Formulae 3' and 4'.

$$70 < v_{r1} < 96 \quad (3)'$$

$$0.6 < f_{r1}/f_r < 0.9 \quad (4)'$$

When a refractive index of a positive lens of the image plane lens group G6 located closest to the image plane side is $N_{rp}$ at a d-line (587.56 nm), a paraxial radius of curvature of an object side surface of the positive lens located closest to the image plane side is $r_{rp1}$, and a paraxial radius of curvature of an image side surface of the positive lens located closest to the image plane side is $r_{rp2}$, the zoom lens may satisfy Formulae 5 and 6. In this case, in any of the zoom lenses according to the first and second embodiments, a lens of the image plane lens group G6 located closest to the image plane side may be the positive lens L17 having a shape convex toward the image plane side.

$$1.8 < N_{rp} \quad (5)$$

$$0.0 < (r_{rp1} + r_{rp2})/(r_{rp1} - r_{rp2}) < 5.0 \quad (6)$$

Formula 5 may define a refractive index of the positive lens L17 located closest to the image lane side at a d-line (587.56 nm). When a glass material having a refractive index that is reduced to exceed a lower limit of Formula 5 is selected, a convergence effect may be reduced, thereby making it difficult to reduce a total length of the zoom lens.

Formula 6 may define a paraxial radius of curvature of an object side surface of the positive lens L17 located closest to the image plane side and a paraxial radius of curvature of an image side surface of the positive lens L17 located closest to the image plane side. When a curvature of the object side surface of the positive lens is increased to exceed an upper limit of Formula 6 and to have a shape convex toward the image plane side, a convergence effect may be reduced, thereby making it difficult to reduce a total length of the zoom lens. Also, when a curvature of the image side surface of the positive lens exceeds an upper limit, the shape convex toward the image plane side may not be maintained.

When a curvature of the object side surface of the positive lens is reduced to exceed a lower limit of Formula 6, a curvature of the image side surface may be increased. As a result, a ghost or the like may occur when a ray reflected from the imaging surface of the solid-state imaging device or the optical filter is re-incident on the imaging surface of the solid-state imaging device due to reflection from a plane.

Any of the zoom lenses according to the first and second embodiments may satisfy Formulae 5' and 6'.

$$1.9 < N_{rp} \quad (5)'$$

$$0.2 < (r_{p1} + r_{rp2})/(r_{rp1} - r_{rp2}) < 1.0 \quad (6)'$$

In any of the zoom lenses according to the first and second embodiments, a lens group located closest to the object side from among the plurality of lens groups constituting the subsequent group may be the third lens group G3. The third lens group G3 may be located closer to the object side than the stop SP. Also, the third lens group G3 may have a negative refractive power as a whole. The third lens group G3 may move along the optical axis O during focusing.

In general, in a positive-lead-type zoom lens in which a lens group located closest to the object side has a positive refractive power, a second lens group having a negative refractive power becomes a main zooming lens group. In the zoom lens having this structure, an amount of change in lateral magnification during zooming from the wide angle position to the telephoto position may be increased.

Accordingly, any of the zoom lenses according to the first and second embodiments may include the second lens group G2, and the third lens group G3 having a negative refractive power and located next to the second lens group G2 to face the image plane side, instead of the second lens group G2 that contributes to a change in lateral magnification. In this structure, the third lens group G3 may be a movable group and displacement of the image plane IP during zooming may be corrected by using the third lens group G3. Also, since the second lens group G2 mainly contributes to a change in lateral magnification, the third lens group G3 that is a focus group may suppress a change in lateral magnification during zooming and may suppress a change in a viewing angle during focusing.

In any of the zoom lenses according to the first and second embodiments, the second lens group G2 may have a largest negative refractive power in the zoom lens. Also, the second lens group G2 may be fixed during zooming from the wide angle position to the telephoto position. Stable optical performance may be ensured during manufacture by fixing the second lens group G2 that causes a large change in lateral magnification during zooming. However, the second lens group G2 may not have to be fixed and the present invention is not limited thereto.

In any of the zoom lenses according to the first and second embodiments, the subsequent group may include the third lens group G3 having a negative refractive power as a whole, the stop SP, the fourth lens group G4 having a positive refractive power as a whole, the fifth lens group G5 having a negative refractive power as a whole, and the image plane lens group G6 having a positive refractive power as a whole, wherein the third lens group G3, the stop SP, the fourth lens group G4, the fifth lens group G5, and the image plane lens group G6 are sequentially arranged from the object side.

In the zoom lens of the present embodiment, aberration correction needs to be performed with high precision by using a focus depth in order to achieve a relatively large aperture having an F-number of about 2.8. In particular, field curvature is problematic in correcting aberration and field curvature from the wide angle position to the telephoto position needs to be corrected to be within a predetermined range. A portion having a large change in field curvature caused by an interval change may be a portion between the fifth lens group G5 and the image plane lens group G6. Also, a portion between the fourth lens group G4 and the fifth lens group G5 may have a large change in field curvature caused by an interval change. Accordingly, when zooming from the wide angle position to the telephoto position is performed in the zoom lens of the present embodiment, field curvature may be satisfactorily corrected by moving the fourth lens group G4, the fifth lens group G5, and the image plane lens group G6 along the optical axis O.

Also, in the zoom lens of the present embodiment, a bundle of rays diverged from the second lens group G2 and the third lens group G3 may be appropriately controlled and a bundle of rays incident on the fourth lens group G4 may be controlled by locating the stop SP between the third lens group G3 and the fourth lens group G4. Accordingly, a lens diameter of the fourth lens group G4 may be miniaturized.

In any of the zoom lenses according to the first and second embodiments, the third lens group G3 includes at least one negative lens, and when a focal length of the third lens group G3 is $f_3$, and a focal length of the zoom lens at the wide angle position is $f_w$, the zoom lens may satisfy Formula 7 as follows.

$$2.0<|f_3/f_w|<4.0 \tag{7}$$

Since the third lens group G3 is a focus group, by including at least one negative lens in the third lens group G3, a weight of the third lens group G3 may be reduced and a driving device for moving the third lens group G3 along the optical axis O may be miniaturized. The at least one negative lens may be, for example, the negative lens L7.

Formula 7 may define a focal length of the third lens group G3 and a focal length of the zoom lens at the wide angle position. When a refractive power of the third lens group G3 is reduced to exceed a lower limit of Formula 7, an amount of movement of the third lens group G3 during focusing may be increased, thereby making it difficult to reduce a total length.

When a refractive power of the third lens group G3 is increased to exceed an upper limit of Formula 7, coma and field curvature due to eccentricity may be worsened.

Any of the zoom lenses according to the first and second embodiments may satisfy Formula 7'.

$$2.4<|f_3/f_w|<3.0 \tag{7'}$$

In any of the zoom lenses according to the first and second embodiments, the third lens group G3 includes one negative lens L7 having a meniscus shape convex toward the image plane side, and when a thickness of the lens of the third lens group G3 along the optical axis O is $d_3$ and a focal length of the zoom lens at the wide angle position is $f_w$, the zoom lens may satisfy formula 8.

$$0.02<d3/f_w<0.07 \tag{8}$$

Coma and field curvature may be satisfactorily corrected by including one negative lens L7, which has a meniscus shape convex toward the image plane side, in the third lens group G3.

Formula 8 may define a thickness of the third lens group G3 and a focal length of the zoom lens at the wide angle position. When a thickness of the third lens group G3 is increased to exceed an upper limit of Formula 8, a weight of the third lens group G3 may be increased and a size of a driving device for moving the third lens group G3 along the optical axis O may be increased. Also, as a thickness of the third lens group G3 is increased, it may be difficult to reduce a total length of the zoom lens.

When a thickness of the third lens group G3 is reduced to exceed a lower limit of Formula 8, the lens may be bent or cracked while being processed, thereby increasing a processing difficulty. Also, it may be difficult to enhance a negative refractive power of the third lens group G3, an amount of movement during focusing may be increased, or it may be difficult to reduce a total length of the zoom lens.

Any of the zoom lenses according to the first and second embodiments may satisfy Formula 8'.

$$0.03<d3/f_w<0.05 \tag{8'}$$

In any of the zoom lenses according to the first and second embodiments, the second lens group G2 may include at least one positive lens and at least one negative lens and at least one surface of any one of lenses constituting the second lens group G2 may be an aspherical surface. When a focal length of the second lens group G2 is $f_2$, a focal length of the third lens group G3 is $f_3$, and a focal length of the zoom lens at the wide angle position is $f_w$, the zoom lens may satisfy Formulae 9 and 10.

$$1.2<|f_2/f_w|<2.4 \tag{9}$$

$$0.5<f_2/f_3<1.2 \tag{10}$$

The second lens group G2 may be a main zooming group, and may require an appropriate negative refractive power in order to reduce a total length of the zoom lens and ensure high performance. In the zoom lens of the present embodiment, chromatic aberration of magnification may be satisfactorily corrected by including at least one positive lens and at least one negative lens in the second lens group G2. For example, the second lens group G2 may include the positive lens L6 and two negative lenses L4 and L5.

Also, coma at the wide angle position may be satisfactorily corrected by including at least one aspherical surface in any one of lenses constituting the second lens group G3. For example, in the present embodiment, the negative lens L5 that is the second lens from among three lenses L4 through L6 constituting the second lens group G2 may include an aspherical surface.

Formula 9 may define a focal length of the second lens group G2 and a focal length of the zoom lens at the wide angle position. When a negative refractive power of the second lens group G2 is reduced to exceed an upper limit of Formula 9, it may be difficult to ensure a desired amount of zooming unless a change in an air gap between the first lens group G1 and the second lens group G2 during zooming is large. In this case, a size of the zoom lens may be increased.

When a negative refractive power of the second lens group G2 is increased to exceed a lower limit of Formula 9, it may be difficult to correct coma at the wide angle position.

Formula 10 may define a focal length of the second lens group G2 and a focal length of the third lens group G3. When an upper limit of Formula 10 is exceeded, burden of magnification change may be increased in the third lens group during zooming of the second lens group G2 and the third lens group G3. In this case, a change in lateral magnification due to the third lens group G3 may be increased and a change in a viewing angle during focusing may be increased.

When a lower limit of Formula 10 is exceeded, burden of magnification of change may be increased in the second lens group G2 during zooming of the second lens group G2 and the third lens group G3. In this case, since a negative refractive power of the third lens group G3 is reduced, an amount of movement during focusing may be increased and it may be difficult to reduce a total length of the zoom lens.

Any of the zoom lenses according to the first and second embodiments may satisfy Formulae 9' and 10'.

$$1.5 < |f_2/f_w| < 1.8 \quad (9)'$$

$$0.6 < f_2/f_3 < 0.8 \quad (10)'$$

In any of the zoom lenses according to the first and second embodiments, the first lens group G1 includes at least one positive lens and at least one negative lens, and when a focal length of the first lens group G1 is $f_1$ and a focal length of the zoom lens at the telephoto position is $f_t$, the zoom lens may satisfy Formula 11.

$$1.0 < f_1/f_t < 4.0 \quad (11)$$

In the zoom lens of the present embodiment, in particular, chromatic aberration of magnification and axial chromatic aberration at the telephoto position may be satisfactorily corrected by including at least one positive lens and at least one negative lens in the first lens group G1. For example, the first lens group G1 may include two positive lenses L2 and L3 and one negative lens L1.

Also, in the zoom lens of the present embodiment, positive refractive powers may be distributed and spherical aberration at the telephoto position may be satisfactorily corrected by sequentially arranging, from the object side, the negative lens L1 having a meniscus shape convex toward the object side and the positive lens L3 having a meniscus shape convex toward the object side.

Formula 11 may define a focal length of the first lens group G1 and a focal length of the zoom lens at the telephoto position. When a refractive power of the first lens group G1 is reduced to exceed an upper limit of Formula 11, a lens diameter of the first lens group G1 may be increased, thereby making it difficult to miniaturize the zoom lens.

When a refractive power of the first lens group G1 is increased to exceed a lower limit of Formula 11, it may be difficult to correct all aberration and high performance may not be ensured.

Any of the zoom lenses according to the first and second embodiments may satisfy Formula 11'.

$$1.7 < f_1/f_t < 2.0 \quad (11)'$$

In any of the zoom lenses according to the first and second embodiments, blur may be corrected by including at least one positive lens and at least one negative lens in the fifth lens group G5 and moving the fifth lens group G5 within a plane intersecting the optical axis O. When a focal length of the fifth lens group G5 is $f_5$ and a focal length of the zoom lens at the telephoto position is $f_t$, the zoom lens may satisfy Formula 12.

$$0.2 < |f_5/f_t| < 2.0 \quad (12)$$

In the zoom lens of the present embodiment, blur caused by a vibration such as a hand shake may be optically corrected by moving the fifth lens group G5 within a plane intersecting the optical axis O. Also, in the zoom lens of the present embodiment, chromatic aberration during correction of blur may be satisfactorily corrected by including at least one positive lens and at least one negative lens in the fifth lens group G5. For example, the fifth lens group G5 may include the positive lens L12 and the negative lens L11. Also, at least one surface of the negative lens L11 may be an aspherical surface. Accordingly, coma during correction of blur may be satisfactorily corrected.

Formula 12 may define a focal length of the fifth lens group G5 and a focal length of the zoom lens at the telephoto position. When a refractive power of the fifth lens group G5 is reduced to exceed an upper limit of Formula 12, an amount of movement of the fifth lens group G5 during correction of blur may be increased, a workload needed for driving may be increased, and it may be difficult to miniaturize a driving device for moving the fifth lens group G5 along the optical axis O.

When a refractive power of the fifth lens group G5 is increased to exceed a lower limit of Formula 12, an amount of movement of the fifth lens group G5 during correction of blur may be too reduced, controlling correction of blur may be difficult, and blur may occur.

Any of the zoom lenses according to the first and second embodiments may satisfy Formula 12'.

$$0.5 < |f_5/f_t| < 1.0 \quad (12)'$$

In any of the zoom lenses according to the first and second embodiments, the fourth lens group G4 may include at least one positive lens and at least one negative lens and at least one surface of any one of lenses constituting the fourth lens group G4 may be an aspherical surface. When a focal length of the fourth lens group G4 is $f_4$ and a focal length of the zoom lens at the telephoto position is $f_t$, the zoom lens may satisfy Formula 13.

$$0.2 < f_4/f_t < 0.6 \quad (13)$$

In the zoom lens of the present embodiment, since an axial bundle of rays on the fourth lens group G4 is largest at the object side, spherical aberration tends to occur in a lens component of the fourth lens group G4 located at the object side. Accordingly, positive refractive powers may be distributed and spherical aberration at the telephoto position may be satisfactorily corrected by including at least one positive lens and at least one negative lens in the fourth lens group G4. For example, the fourth lens group G4 may include two positive lenses L8 and L9 and one negative lens L10.

Also, in the zoom lens of the present embodiment, axial chromatic aberration may be satisfactorily corrected by cementing the positive lens L9 to the negative lens L10 to form a double lens. Also, the positive lens L8 located closest to the object side from among the lenses L8 through L10 constituting the fourth lens group G4 may include an aspherical surface. Accordingly, spherical aberration at the telephoto position may be satisfactorily corrected.

Formula 13 may define a focal length of the fourth lens group G4 and a focal length of the zoom lens at the telephoto position. When a refractive power of the fourth lens group G4 is reduced to exceed an upper limit of Formula 13, a converging function of the fourth lens group G4 is reduced and an axial bundle of rays incident on the fifth lens group G5 is increased. In this case, since a lens diameter of the fifth lens group G5 that is a blur correction group is increased, a weight may be increased. As a result, a size of a driving device for moving the fifth lens group G5 may be increased and a size of the zoom lens may be increased.

When a refractive power of the fourth lens group G4 is increased to exceed a lower limit of Formula 13, it is difficult to correct spherical aberration at the telephoto position.

Any of the zoom lenses according to the first and second embodiments may satisfy Formula 13'.

$$0.3 < f_4/f_t < 0.45 \tag{13'}$$

In the zoom lens of the present embodiment that satisfies the above condition, satisfactory optical performance is maintained during zooming and focusing and during correction of blur, and miniaturization and high performance are achieved. That is, according to the present embodiment, the zoom lens having a zoom ratio of about 3 and a relatively large aperture having an F-number of about 2.8 may be realized. High optical performance may be achieved by satisfactorily correcting aberration occurring during correction of blur and displacement of the image plane caused by zooming, and a size and a weight may be reduced by reducing a total length of the zoom lens. Also, an actuator for driving a focus group may be miniaturized by reducing a weight of the focus group.

The present invention is not limited to the zoom lens of the above embodiment and various modifications may be made thereto without departing from the scope.

For example, in the zoom lens of the above embodiment, a lens group having a refractive power or a conversion lens group may be located next to the first lens group G1 to face the object side, as required.

Various embodiments and effects thereof will now be explained. The following embodiments are example embodiments and the present invention is not limited thereto.

First Numerical Embodiment

Figure 2:
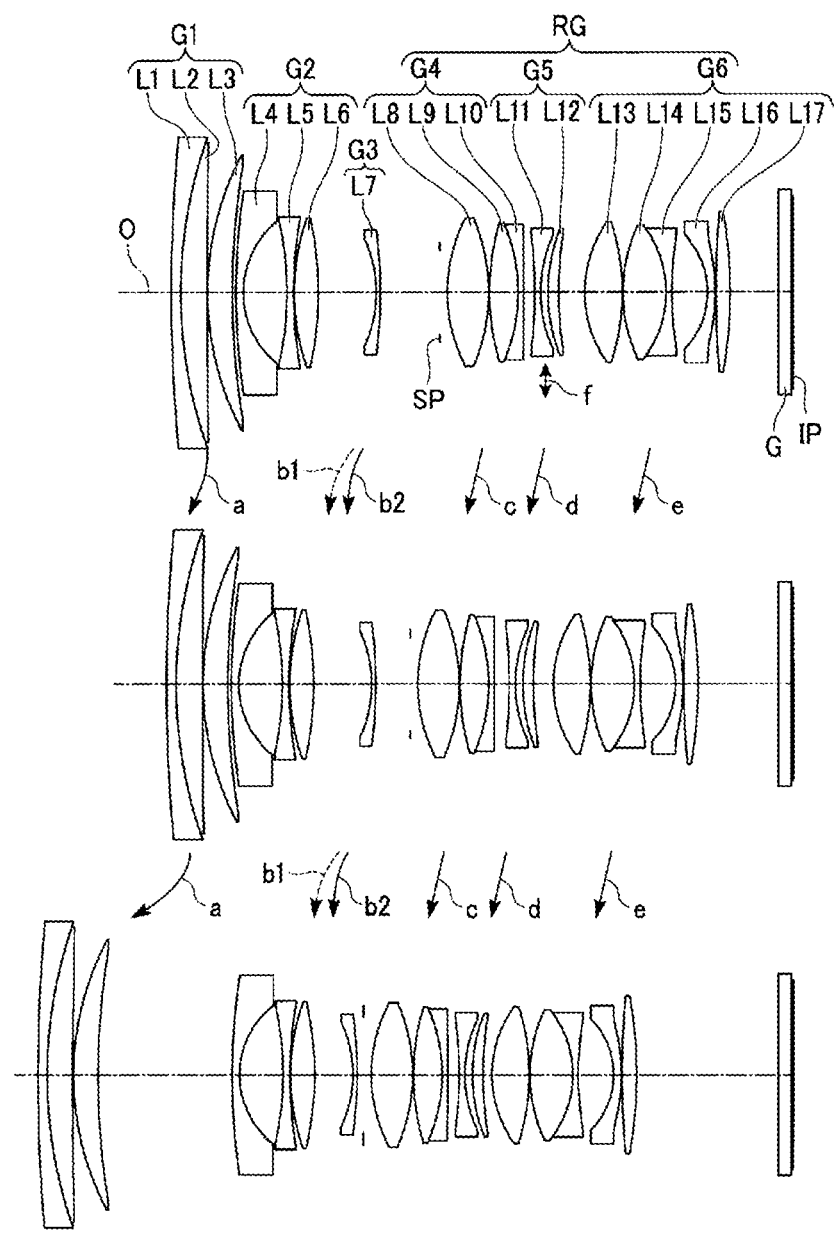
FIG. 2 illustrates an arrangement of lenses at a wide angle position W, a middle position M, and a telephoto position T in a zoom lens of a first numerical embodiment.

FIG. 2 illustrates a configuration of a zoom lens according to design data of a first numerical embodiment. Also, in FIG. 2, W denotes an arrangement of lenses at the wide angle position, M denotes an arrangement of lenses at the middle position, and T denotes an arrangement of lenses at the telephoto position.

The zoom lens of the first numerical embodiment of FIG. 2 has the same lens configuration as that of the zoom lens of FIG. 1, and performs the same lens operations, such as zooming, focusing, and correction of blur, as those of the zoom lens of FIG. 1. Accordingly, in FIG. 2, the same elements as those of the zoom lens of FIG. 1 are denoted by the same reference numerals and a movement trajectory of each lens is indicated by the same arrow(s).

Design data of the zoom lens of the first numerical embodiment is as shown in Tables 1 through 5.

TABLE 1

| Surface number | r | d | nd | v d |
|---|---|---|---|---|
| 1 | 369.951 | 2.100 | 1.84667 | 23.79 |
| 2 | 102.245 | 5.950 | 1.75500 | 52.33 |
| 3 | 1322.049 | 0.150 | | |
| 4 | 65.282 | 5.640 | 1.77250 | 49.61 |
| 5 | 171.485 | d5 | | |
| 6 | 150.264 | 1.680 | 1.88300 | 40.81 |
| 7 | 20.208 | 10.060 | | |
| 8* | −70.890 | 1.500 | 1.73960 | 49.10 |
| 9* | 70.74 | 0.150 | | |
| 10 | 49.298 | 5.560 | 1.84667 | 23.79 |
| 11 | −75.710 | d11 | | |
| 12 | −28.013 | 0.900 | 1.61800 | 63.39 |
| 13 | −109.598 | d13 | | |
| 14 | ∞ | 1.700 | | |
| 15* | 30.688 | 9.420 | 1.58930 | 60.60 |
| 16* | −38.375 | 0.150 | | |
| 17 | 53.156 | 6.620 | 1.49700 | 81.61 |
| 18 | −38.007 | 1.250 | 1.80518 | 25.46 |
| 19 | −1188.191 | d19 | | |
| 20* | −116.333 | 1.300 | 1.69012 | 52.90 |
| 21* | 27.142 | 1.780 | | |
| 22 | 38.815 | 2.400 | 1.76182 | 26.61 |
| 23 | 84.387 | d23 | | |
| 24 | 26.983 | 8.510 | 1.49700 | 81.61 |
| 25 | −51.771 | 0.150 | | |
| 26 | 35.045 | 9.820 | 1.49700 | 81.61 |
| 27 | −23.971 | 1.300 | 1.80450 | 39.64 |
| 28 | 77.308 | 8.020 | | |
| 29* | −16.876 | 1.770 | 1.80470 | 40.90 |
| 30* | −36.696 | 0.150 | | |
| 31 | 200.000 | 3.290 | 1.92287 | 20.88 |
| 32 | −101.480 | d32 | | |
| 33 | ∞ | 3.000 | 1.51680 | 64.20 |
| 34 | ∞ | 0.500 | | |

Also, a lens surface number "i" (i is a natural number) shown in Table 1 represents one of numbers of lens surfaces that sequentially increase toward the image plane side from an object side surface of a lens of the zoom lens located closest to the object side.

Also, "r" shown in Table 1 denotes a radius [mm] of curvature of a lens surface corresponding to each lens surface number. A surface having a radius of curvature "r" of ∞ in Table 1 is flat.

Also, "d" shown in Table 1 denotes an interval [mm] between an $i^{th}$ lens surface and a $(i+1)^{th}$ lens surface along the optical axis O from the object side. "$d_i$" denotes a case where an interval between the $i^{th}$ lens surface and the $(i+1)^{th}$ lens surface is changed due to zooming. In Table 1, d5, d11, d13, d19, d23, and d32 denote variable intervals.

Also, "nd" shown in Table 1 denotes a refractive index of each lens.

Also, "vd" shown in Table 1 denotes an Abbe number of each lens.

TABLE 2

Zoom magnification 2.74

| | Wide angle position | Middle position | Telephoto position |
|---|---|---|---|
| Focal length | 24.700 | 32.000 | 67.800 |
| F value | 2.88 | 2.88 | 2.88 |
| Half field angle (°) | 43.09 | 35.16 | 17.44 |
| Image height | 21.640 | 21.640 | 21.640 |
| Lens total length | 142.103 | 142.669 | 171.911 |
| bF (in air) | 13.580 | 20.523 | 34.156 |
| d 5 | 0.836 | 1.402 | 30.643 |
| d 11 | 13.272 | 12.789 | 8.730 |
| d 13 | 13.558 | 7.916 | 1.400 |
| d 19 | 2.547 | 3.241 | 2.530 |
| d 23 | 5.968 | 4.456 | 2.109 |
| d 32 | 11.102 | 18.045 | 31.678 |

Table 2 shows a zoom ratio, a "focal length" [mm] at each of the wide angle position, the middle position, and the telephoto position, an "F-number (Fno)", a "half field angle (ω)" [°], an "image height" [mm], a "lens total length" [mm], and a "back focus (bF)" [mm] Also, the lens total length is a value obtained by adding the back focus (bF) to a distance from an object side surface of a lens located closest to the object side to an image side surface of a lens located closest to the image plane side. Also, the back focus (bF) is a value obtained by calculating a distance (air conversion distance) from an image side surface of a lens located closest to the image plane side to a paraxial image plane. That is, a value obtained by summing a distance between an object side surface of a first lens of a lens group and an image side surface of a last lens of the lens group and a distance between the image side surface of the last lens and an imaging surface along the optical axis corresponds to the lens total length. Di denotes a variable length from an $i^{th}$ lens surface to a $(i+1)^{th}$ lens surface as described above. Distances at the wide angle position, the middle position, and the telephoto position are shown in Table 2.

TABLE 3

| Surface number | K | a4 | a6 | a8 | a10 |
|---|---|---|---|---|---|
| 8 | 0 | 3.00297 E−06 | −1.2461 E−08 | 1.13175 E−11 | −2.13491 E−14 |
| 9 | 0 | −2.14775 E−06 | −1.4037 E−08 | −8.33520 E−13 | −5.05437 E−15 |
| 15 | 0 | −9.17740 E−06 | −1.2201 E−09 | −6.19858 E−13 | −2.67254 E−14 |
| 16 | 0 | 6.13088 E−06 | −1.1896 E−08 | 3.32451 E−11 | −5.26947 E−14 |
| 20 | 0 | −4.03409 E−06 | 5.7264 E−09 | 3.38692 E−11 | −6.65735 E−14 |
| 21 | 0 | −1.39239 E−05 | 1.8341 E−08 | 3.63238 E−11 | 3.38946 E−14 |
| 29 | 0 | 5.35184 E−06 | 1.3389 E−07 | −3.87910 E−10 | 2.46755 E−12 |
| 30 | 0 | 1.76585 E−05 | 7.11614 E−08 | −1.55511 E−10 | 2.18323 E−13 |

Table 3 shows a page number (a lens surface number marked with * in Table 1) of a lens that includes an aspherical surface, and an aspherical coefficient. Also, an aspherical surface may be expressed by the following mathematical formula X using a displacement along the optical axis O at a height H from the optical axis O, based on a vertex of the aspherical surface. Also, "R" denotes a radius of curvature, "K" denotes a conic integer, and "a4, a6, a8, and a10" denote aspherical coefficients. Also, "e±m" (m is an integer) in a value of an aspherical coefficient denotes "x10$^{±m}$".

[Mathematical Formula 1]
$$X = \frac{(1/R)H^2}{1+\sqrt{1-(1+K)(H/R)^2}} +$$

-continued
$$A_4H^4 + A_6H^6 + A_8H^8 + A_{10}H^{10}$$

TABLE 4

| Formula | First numerical embodiment |
|---|---|
| (1) | 2.039 |
| (2) | 0.833 |
| (3) | 81.607 |
| (4) | 0.733 |
| (5) | 1.933 |
| (6) | 0.327 |
| (7) | 2.466 |
| (8) | 0.036 |
| (9) | 1.635 |
| (10) | 0.663 |
| (11) | 1.779 |
| (12) | 0.723 |
| (13) | 0.411 |

Table 4 shows a formula of each of (1) "$f_t/f_w$", (2) "$dr_{W-T}/f_w$", (3) "$v_{r1}$", (4) "$f_{r1}/f_r$", (5) "$N_{rp}$", (6) "$(r_{rp1}+r_{rp2})/(r_{rp1}-r_{rp2})$", (7) "|$f_3/f_w$|", (8) "$d_3/f_w$", (9) "|$f_2/f_w$|", (10) "$f_2/f_3$", (11) "$f_1/f_t$", (12) "|$f_4/f_t$|", and (13) "$f_4/f_t$".

TABLE 5

| | Wide angle position | Telephoto position |
|---|---|---|
| First numerical embodiment | 0.142 mm | 0.254 mm |

Table 5 shows an amount of movement [mm] of the fifth lens group G5 in a direction perpendicular to the optical axis O during correction of blur at the wide angle position, and an amount of movement [mm] of the fifth lens group G5 in the direction perpendicular to the optical axis O during correction of blur at the telephoto position.

Longitudinal aberration diagrams (each including a spherical aberration diagram, an astigmatism diagram, and a distortion diagram) of the zoom lens of the first numerical embodiment constructed as described above are illustrated in FIG. 3.

Figure 3:
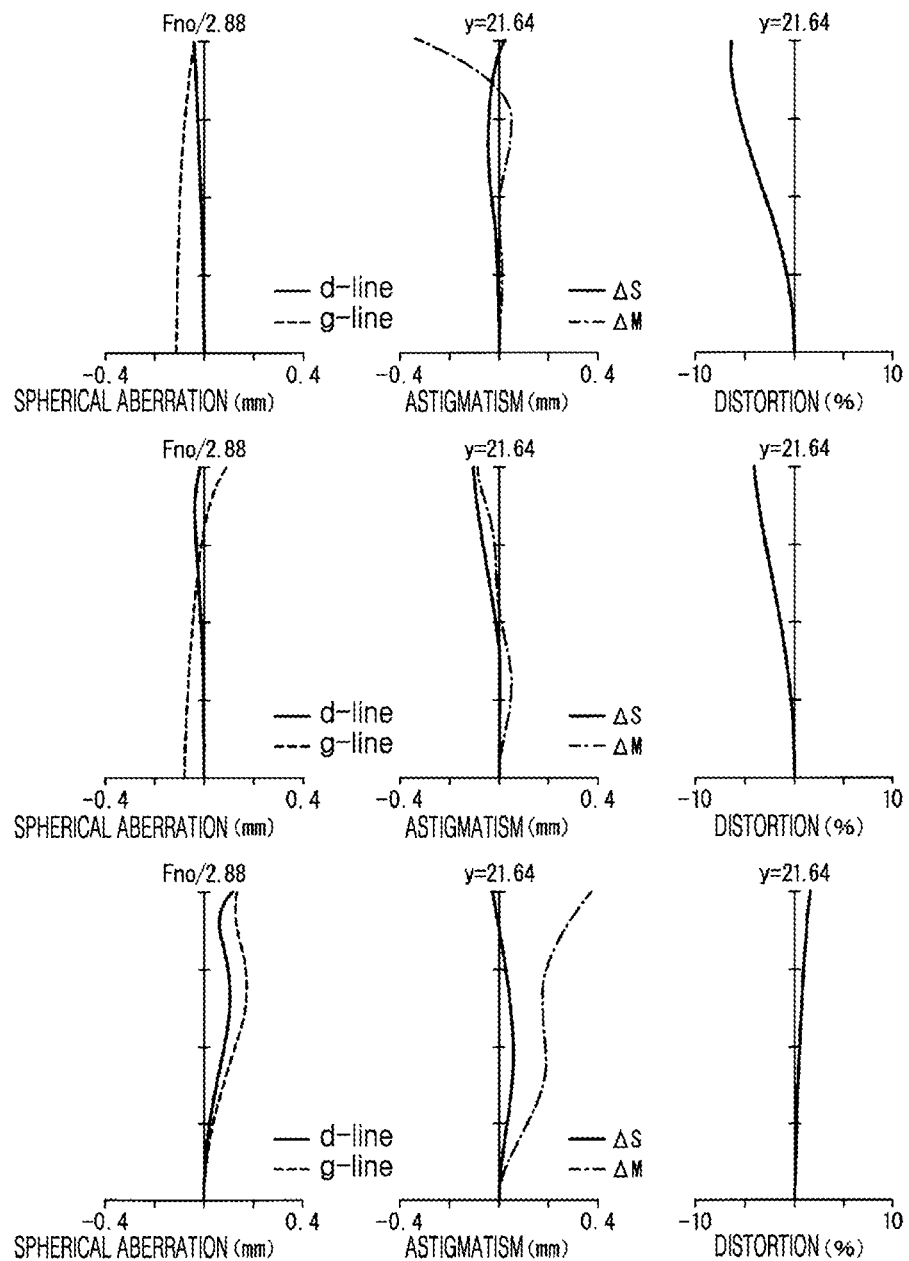
FIG. 3 illustrates spherical aberration, astigmatism, and distortion at the wide angle position W, the middle position M, and the telephoto position T in the zoom lens of the first numerical embodiment.

Also, in FIG. 3, W denotes a longitudinal aberration diagram at the wide angle position, M denotes a longitudinal aberration diagram at the middle position, and T denotes a longitudinal aberration diagram at the telephoto position. Also, each longitudinal aberration diagram sequentially shows a spherical aberration diagram [mm], an astigmatism diagram [mm], and a distortion diagram [%] from the left.

In the spherical aberration diagram, the longitudinal axis represents an F-number (Fno), and spherical aberration for a d-line (wavelength of 587.56 nm) is marked with a solid line and spherical aberration for a g-line (wavelength of 435.835 nm) is marked with a dashed line.

In the astigmatism diagram, the longitudinal axis represents an image height (y), and astigmatism caused by a sagittal ray ΔS and a meridional ray ΔM at each wavelength are respectively marked with a solid line and a dash-dotted line.

In the distortion diagram, the longitudinal axis represents an image height (h), and distortion for a d-line (wavelength of 587.56 nm) is marked with a solid line.

Figure 4B:
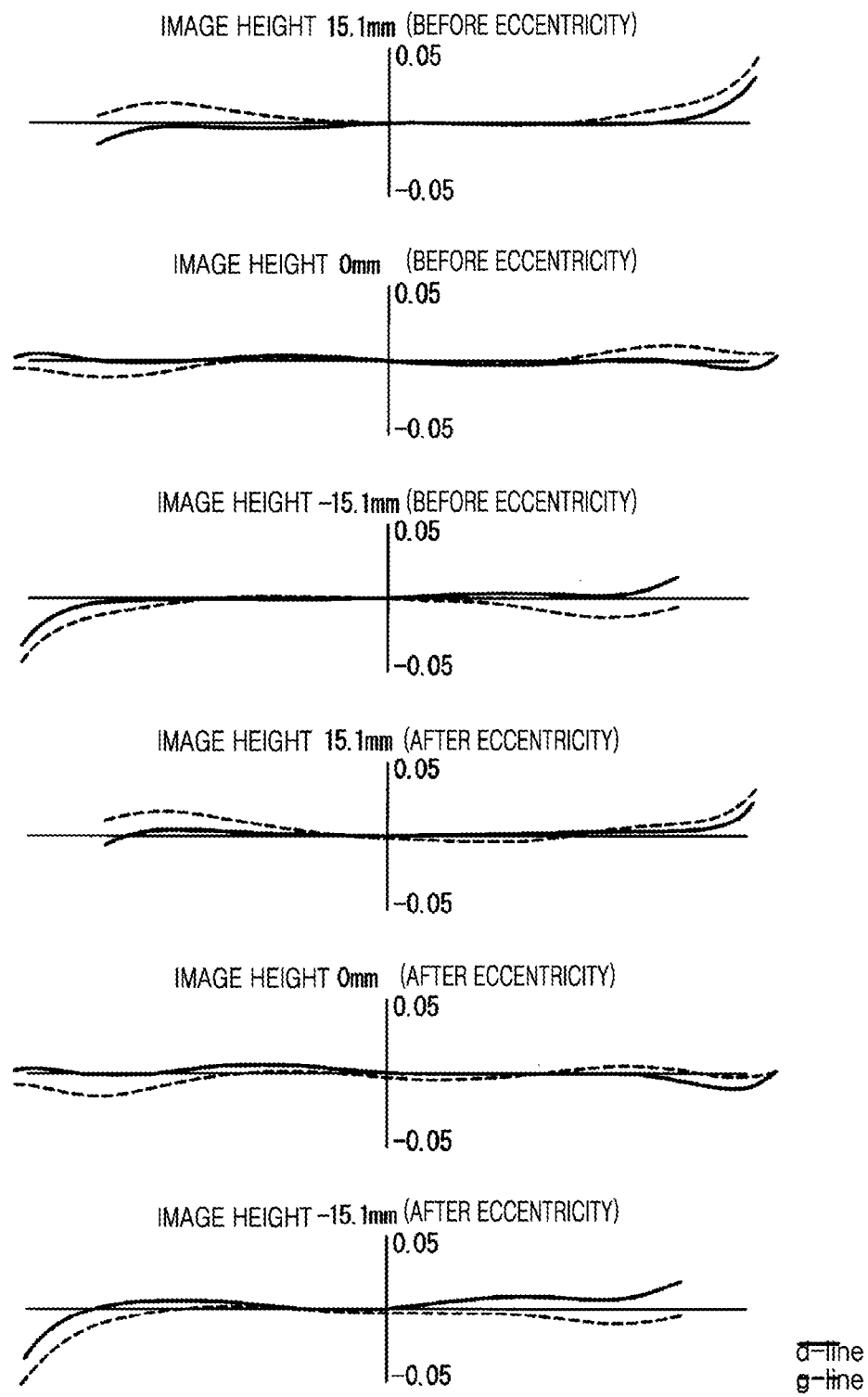
FIG. 4B illustrates lateral aberration at the telephoto position T in the zoom lens of the first numerical embodiment.

Also, lateral aberration diagrams at an infinity focus position before (normal) and after (correction of blur) eccentricity of the zoom lens of the first numerical embodiment are illustrated in FIGS. 4A and 4B. Also, FIG. 4A illustrates a lateral aberration diagram of the zoom lens of the first numerical embodiment at the wide angle position. FIG. 4B illustrates a lateral aberration diagram of the zoom lens of the first numerical embodiment at the telephoto position.

Also, in FIGS. 4A and 4B, A shows a lateral aberration diagram before eccentricity at an image height of 10 mm (corresponding to about 70% of a maximum image height), B shows a lateral aberration diagram before eccentricity at an image height of 0 mm (center of the optical axis), C shows a lateral aberration diagram before eccentricity at an image height of −10 mm (corresponding to about −70% of the maximum image height), D shows a lateral aberration diagram after eccentricity at the image height of 10 mm (corresponding to about 70% of the maximum image height), E shows a lateral aberration diagram after eccentricity at the image height of 0 mm (center of the optical axis), and F shows a lateral aberration diagram after eccentricity at the image height of −10 mm (corresponding to about −70% of the maximum image height). Also, in each lateral aberration diagram, the horizontal axis represents a distance from a main ray at an aperture stop position, a solid line indicates a d-line, and a dashed line indicates a g-line.

The zoom lens of the first numerical embodiment satisfies the above conditions as shown in Tables 1 through 5. Also, it was found that in the zoom lens of the first numerical embodiment, each aberration was satisfactorily corrected as shown in FIGS. 3, 4A, and 4B.

For example, in a wide angle position and telephoto position magnification state at an infinity focus position, an amount of image eccentricity when a zoom lens is tilted by 0.3° is equal to an amount of image eccentricity when the lens L6 moves in a direction perpendicular to the optical axis O. Upon examining each lateral aberration diagram, it is found that symmetry of lateral aberration about the center of the optical axis is satisfactory. Also, when the lateral aberration diagram at the image height of 10 mm and the lateral aberration diagram at the image height of −10 mm before eccentricity are compared with those after eccentricity, it is found that curvatures are all small and aberration curves have similar inclinations. As a result, eccentric coma and field curvature due to eccentricity are suppressed to small levels, and thus sufficient imaging performance may be achieved even in a blur correction state.

Second Numerical Embodiment

Figure 5:
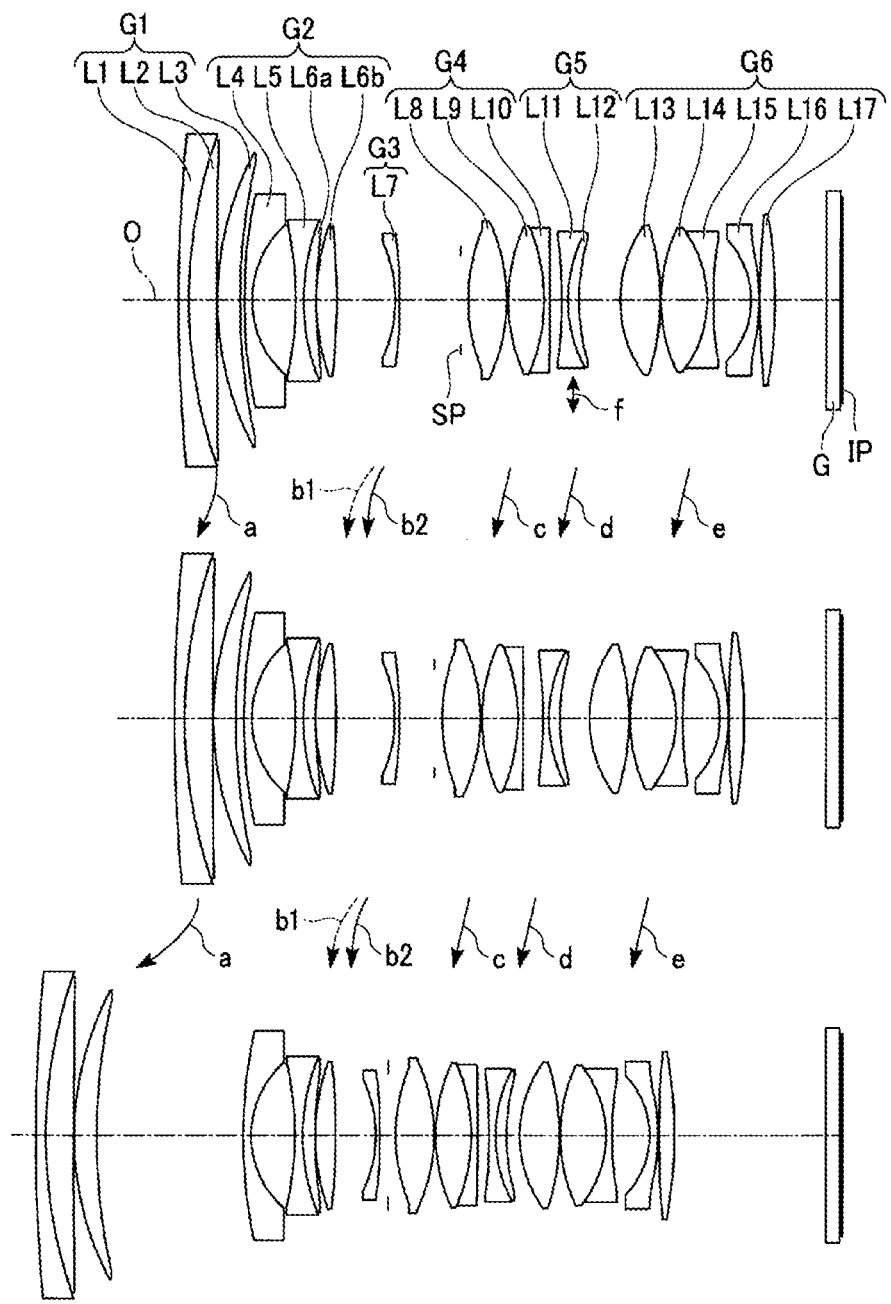
FIG. 5 illustrates an arrangement of lenses at the wide angle position W, the middle position M, and the telephoto position T in a zoom lens of a second numerical embodiment.

A configuration of a zoom lens according to design data of a second numerical embodiment is illustrated in FIG. 5. Also, the zoom lens of the second numerical embodiment of FIG. 5 has the same lens configuration as that of the zoom lens of FIG. 1, except that a positive lens L6a having a meniscus shape convex toward the object side and a positive lens L6b having two convex surfaces are arranged instead of the positive lens L6 of the second lens group G2, and the negative lens L5 and the positive lens L26 are cemented together to form a double lens. Also, the zoom lens of the second numerical embodiment performs the same lens operations, such as zooming, focusing, and correction of blur, as those of the zoom lens of FIG. 1. Accordingly, in FIG. 5, the same elements as those of the zoom lens of FIG. 1 are denoted by the same reference numerals and a movement trajectory of each lens is indicated by the same arrow(s).

Design data of the zoom lens of the second numerical embodiment is as shown in Tables 6 through 10. Also, a way of determining and arranging elements of Tables 6 through 10 is the same as that used to determine and arrange elements of Tables 1 through 5.

TABLE 6

| Surface number | r | d | nd | vd |
|---|---|---|---|---|
| 1 | 250.173 | 2.100 | 1.84667 | 23.79 |
| 2 | 101.717 | 6.060 | 1.72916 | 54.67 |
| 3 | 2203.265 | 0.150 | | |
| 4 | 62.951 | 4.960 | 1.72916 | 54.67 |
| 5 | 132.140 | d5 | | |
| 6 | 112.431 | 1.680 | 1.88300 | 40.81 |
| 7 | 21.397 | 9.150 | | |
| 8* | −58.795 | 1.450 | 1.73960 | 49.10 |
| 9 | 40.078 | 2.780 | 1.74077 | 27.76 |
| 10 | 92.960 | 0.190 | | |
| 11 | 51.021 | 4.140 | 1.84667 | 23.79 |
| 12 | −127.565 | d12 | | |
| 13 | −27.794 | 0.930 | 1.58913 | 61.25 |
| 14 | −135.611 | d14 | | |
| 15 | ∞ | 1.700 | | |
| 16* | 36.494 | 8.030 | 1.58930 | 60.60 |
| 17* | −35.469 | 0.150 | | |
| 18 | 40.938 | 7.170 | 1.49700 | 81.61 |
| 19 | −40.938 | 1.300 | 1.80518 | 25.46 |
| 20 | 1846.012 | d20 | | |
| 21* | −88.513 | 1.300 | 1.69012 | 52.90 |
| 22 | 28.806 | 2.560 | 1.72825 | 28.32 |
| 23 | 51.099 | d23 | | |
| 24 | 29.767 | 8.290 | 1.49700 | 81.61 |
| 25 | −42.381 | 0.150 | | |
| 26 | 38.305 | 9.260 | 1.49700 | 81.61 |
| 27 | −24.544 | 1.240 | 1.70155 | 41.14 |
| 28 | 67.115 | 8.320 | | |
| 29* | −16.924 | 1.500 | 1.80470 | 40.90 |
| 30* | −42.508 | 0.250 | | |
| 31 | 200.136 | 3.720 | 1.92287 | 20.88 |
| 32 | −80.639 | d32 | | |
| 33 | ∞ | 3.000 | 1.51680 | 64.20 |
| 34 | ∞ | 0.500 | | |

TABLE 7

Zoom magnification 2.75

| | Wide angle position | Middle position | Telephoto position |
|---|---|---|---|
| Focal length | 24.700 | 32.000 | 67.900 |
| F value | 2.88 | 2.88 | 2.88 |
| Half field angle (°) | 42.97 | 35.02 | 17.49 |
| Image height | 21.640 | 21.640 | 21.640 |
| Lens total length | 139.950 | 140.350 | 169.112 |
| bF (in air) | 13.703 | 20.303 | 34.503 |
| d5 | 0.800 | 1.200 | 29.961 |
| d12 | 12.071 | 12.381 | 8.634 |
| d14 | 12.992 | 7.358 | 1.400 |
| d20 | 2.609 | 4.180 | 3.661 |
| d23 | 8.722 | 5.875 | 1.900 |
| d32 | 11.225 | 17.825 | 32.025 |

TABLE 8

| Surface number | K | a4 | a6 | a8 | a10 |
|---|---|---|---|---|---|
| 8  | 0 | 3.74395E−06  | −3.51632E−09 | 1.79722 E−11 | −2.23629E−14 |
| 16 | 0 | −1.01553E−05 | −1.79169E−09 | 3.20851 E−11 | −1.48462E−13 |
| 17 | 0 | 1.90750E−06  | −5.88455E−09 | 5.96321 E−11 | −1.97063E−13 |
| 21 | 0 | 2.57632E−06  | 8.58765E−09  | −8.5294 E−12 | −1.68422E−14 |
| 29 | 0 | 6.29582E−06  | 6.39665E−08  | −1.2269 E−10 | 1.28891E−12 |
| 30 | 0 | 1.76622E−05  | 2.82018E−08  | −1.8740 E−11 | −4.53380E−14 |

TABLE 9

| Formula | Second numerical embodiment |
|---|---|
| (1)  | 1.921 |
| (2)  | 0.842 |
| (3)  | 81.594 |
| (4)  | 0.769 |
| (5)  | 1.933 |
| (6)  | 0.426 |
| (7)  | 2.401 |
| (8)  | 0.038 |
| (9)  | 1.506 |
| (10) | 0.627 |
| (11) | 1.814 |
| (12) | 0.702 |
| (13) | 0.399 |

TABLE 10

|  | Wide angle position | Telephoto position |
|---|---|---|
| Second numerical embodiment | 0.143 mm | 0.253 mm |

Figure 6:
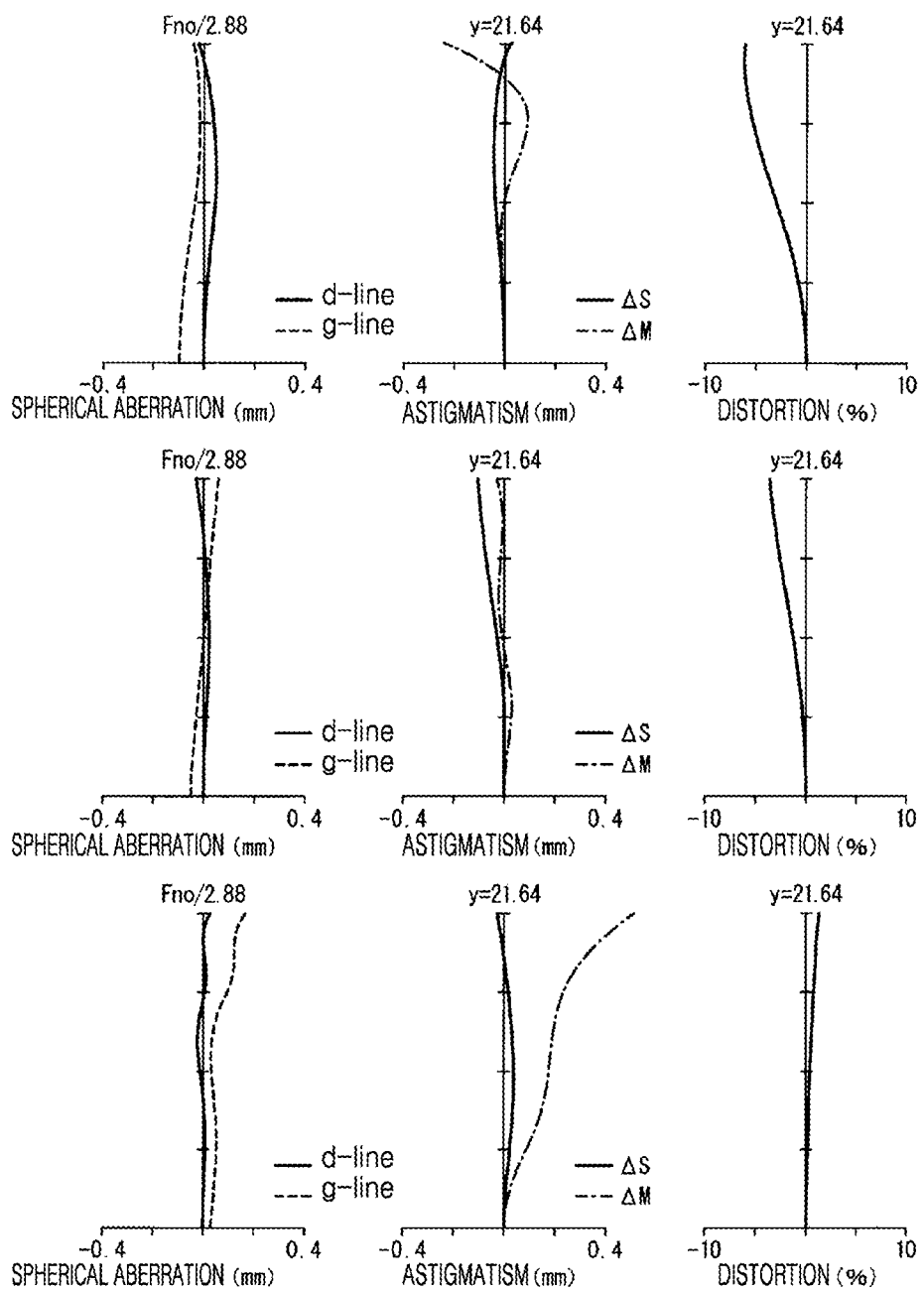
FIG. 6 illustrates spherical aberration, astigmatism, and distortion at the wide angle position W, the middle position M, and the telephoto position T in the second zoom lens of the second numerical embodiment.
Figure 7A:
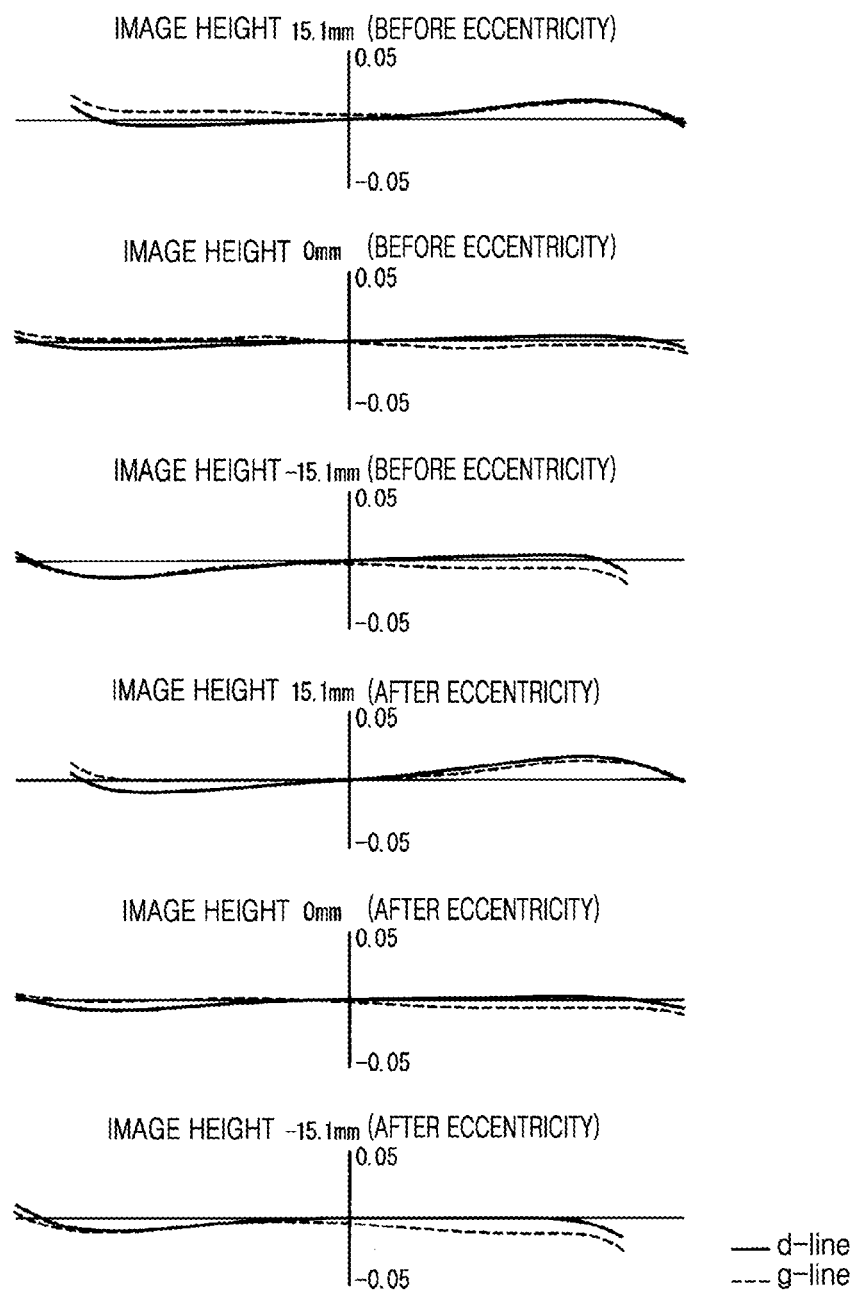
FIG. 7A illustrates lateral aberration at the wide angle position W in the zoom lens of the second numerical embodiment.
Figure 7B:
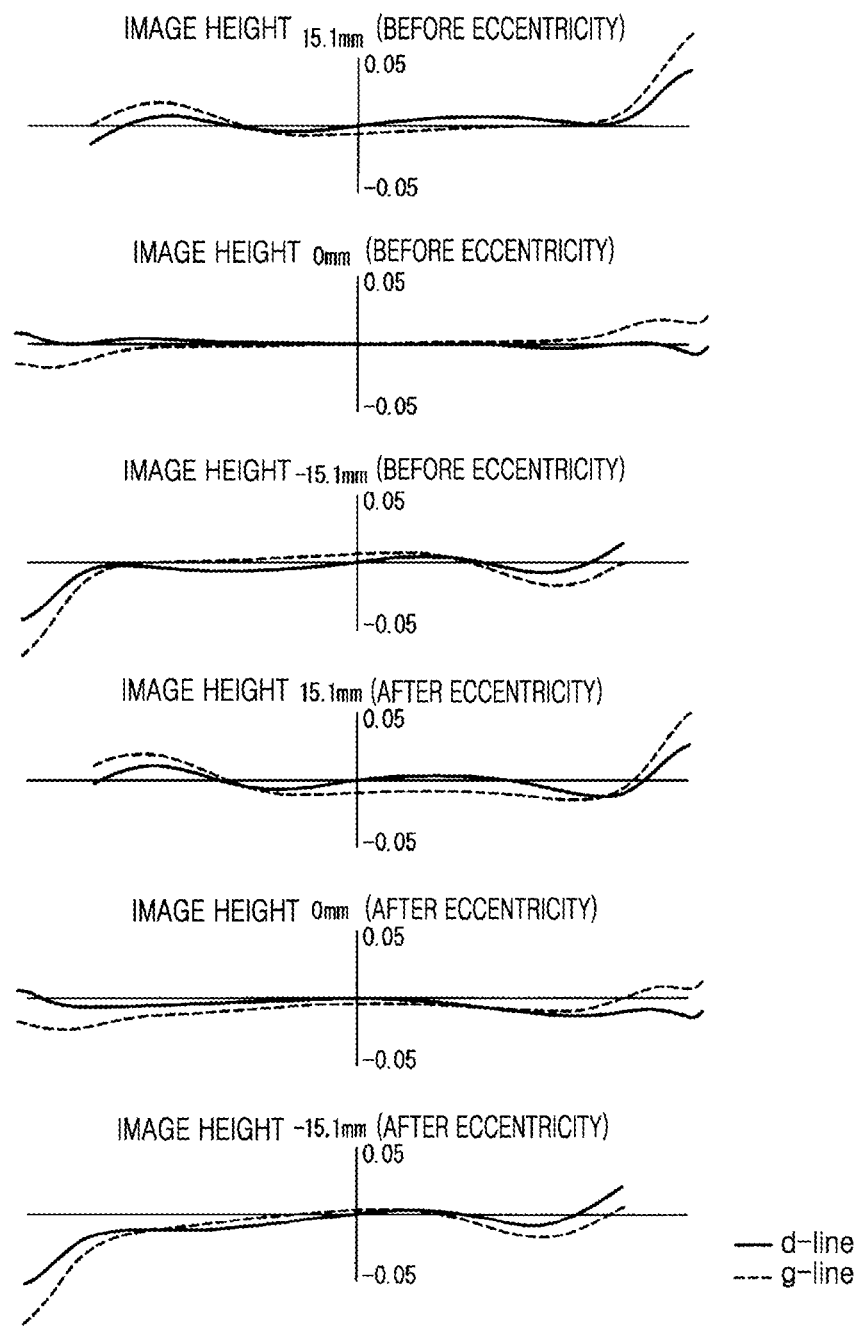
FIG. 7B illustrates lateral aberration at the telephoto position T in the zoom lens of the second numerical embodiment.

Longitudinal aberration diagrams (each including a spherical aberration diagram, an astigmatism diagram, and a distortion diagram) of the zoom lens of the second numerical embodiment constructed as described above are illustrated in FIG. 6. Also, lateral aberration diagrams of the zoom lens of the second numerical embodiment at the wide angle position and the telephoto position are illustrated in FIGS. 7A and 7B. Also, the way in which FIGS. 6, 7A, and 7B are constructed is the same as that used to construct FIGS. 3, 4A, and 4B.

The zoom lens of the second numerical embodiment satisfies the above condition as shown in Tables 6 through 10. Also, it was found that in the zoom lens of the second numerical embodiment, each aberration was satisfactorily corrected as shown in FIGS. 6, 7A, and 7B.

Third Numerical Embodiment

Figure 8:
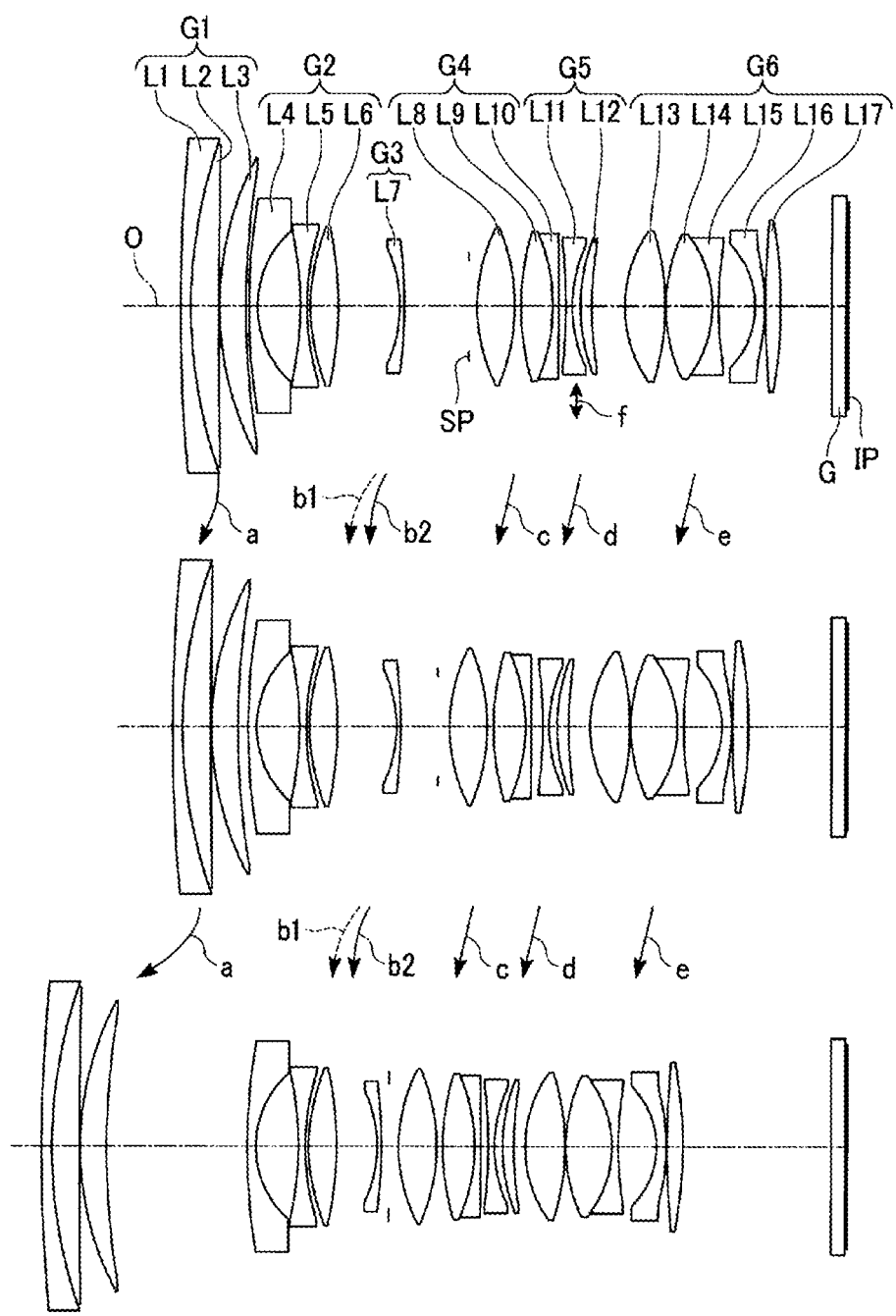
FIG. 8 illustrates an arrangement of lenses at the wide angle position W, the middle position M, and the telephoto position T in a zoom lens of a third numerical embodiment.

A configuration of a zoom lens according to design data of a third numerical embodiment is illustrated in FIG. 8. Also, the zoom lens of the third numerical embodiment of FIG. 8 has the same lens configuration as that of the zoom lens of FIG. 1 and performs the same lens operations, such as zooming, focusing, and correction of blur, as those of the zoom lens of FIG. 1. Accordingly, in FIG. 8, the same elements as those of the zoom lens of FIG. 1 are denoted by the same reference numerals and a movement trajectory of each lens is indicated by the same arrow(s).

Design data of the zoom lens of the third numerical embodiment is as shown in Tables 11 through 15. Also, the way in which elements of Tables 11 through 15 were determined and arranged is the same as that used to determine and arrange elements of Tables 1 through 5.

TABLE 11

| Surface number | r | d | nd | vd |
|---|---|---|---|---|
| 1   | 325.617  | 2.100 | 1.84667 | 23.79 |
| 2   | 102.469  | 6.010 | 1.75500 | 52.33 |
| 3   | 1410.453 | 0.150 |  |  |
| 4   | 65.080   | 5.580 | 1.77250 | 49.61 |
| 5   | 166.185  | d5    |  |  |
| 6   | 140.842  | 1.680 | 1.91082 | 35.25 |
| 7   | 21.364   | 9.510 |  |  |
| 8*  | −60.606  | 1.500 | 1.73960 | 49.10 |
| 9*  | 48.663   | 0.540 |  |  |
| 10  | 41.614   | 6.290 | 1.84667 | 23.79 |
| 11  | −71.202  | d11   |  |  |
| 12  | −27.782  | 0.900 | 1.61800 | 63.39 |
| 13  | −104.542 | d13   |  |  |
| 14  | 8        | 1.700 |  |  |
| 15* | 30.691   | 8.620 | 1.58930 | 60.60 |
| 16* | −39.415  | 1.000 |  |  |
| 17  | 55.959   | 7.080 | 1.49700 | 81.61 |
| 18  | −34.722  | 1.250 | 1.80518 | 25.46 |
| 19  | −274.604 | d19   |  |  |
| 20* | −108.23  | 1.450 | 1.69012 | 52.90 |
| 21* | 27.659   | 1.680 |  |  |
| 22  | 38.023   | 2.470 | 1.72825 | 28.32 |
| 23  | 85.377   | d23   |  |  |
| 24  | 26.627   | 8.600 | 1.49700 | 81.61 |
| 25  | −51.479  | 0.150 |  |  |
| 26  | 36.520   | 9.670 | 1.49700 | 81.61 |
| 27  | −23.667  | 1.300 | 1.80450 | 39.64 |
| 28  | 84.660   | 7.840 |  |  |
| 29* | −17.028  | 2.330 | 1.80470 | 40.90 |
| 30* | −40.231  | 0.150 |  |  |
| 31  | 200.001  | 3.350 | 1.92287 | 20.88 |
| 32  | −97.553  | d32   |  |  |
| 33  | 8        | 3.000 | 1.51680 | 64.20 |
| 34  | 8        | 0.500 |  |  |

TABLE 12

| Zoom magnification 2.74 | | | |
|---|---|---|---|
|  | Wide angle position | Middle position | Telephoto position |
| Focal length       | 24.700  | 32.000  | 67.800  |
| F value            | 2.88    | 2.88    | 2.88    |
| Half field angle (°) | 43.10 | 35.07   | 17.43   |
| Image height       | 21.640  | 21.640  | 21.640  |
| Lens total length  | 142.950 | 144.297 | 172.071 |
| bF (in air)        | 13.478  | 20.214  | 33.998  |
| d 5                | 0.800   | 2.148   | 29.920  |
| d 11               | 12.826  | 12.651  | 8.693   |
| d 13               | 13.598  | 7.999   | 1.400   |
| d 19               | 1.455   | 2.215   | 1.631   |
| d 23               | 6.870   | 5.148   | 2.506   |
| d 32               | 11.000  | 17.736  | 31.520  |

TABLE 13

| Surface number | K | a4 | a6 | a8 | a10 |
|---|---|---|---|---|---|
| 8 | 0 | 5.85118 E−06 | −2.39761 E−08 | 7.04629 E−11 | −7.92329 E−14 |
| 9 | 0 | 2.07558 E−06 | −2.49662 E−08 | 7.32982 E−11 | −8.77521 E−14 |
| 15 | 0 | −9.23190 E−06 | −6.73133 E−09 | 4.33211 E−11 | −1.38939 E−13 |
| 16 | 0 | 5.2059 E−06 | −1.4834 E−08 | 7.13750 E−11 | −1.62214 E−13 |
| 20 | 0 | −5.11761 E−06 | 3.29511 E−08 | −1.14611 E−10 | 2.10674 E−13 |
| 21 | 0 | −1.37072 E−05 | 4.01212 E−08 | −1.6998 E−10 | 3.09434 E−13 |
| 29 | 0 | −5.43033 E−07 | 1.37128 E−07 | −3.50821 E−10 | 2.32900 E−12 |
| 30 | 0 | 1.25712 E−05 | 7.93342 E−08 | −1.69171 E−10 | 2.2954 E−13 |

TABLE 14

| Formula | Third numerical embodiment |
|---|---|
| (1) | 2.093 |
| (2) | 0.831 |
| (3) | 81.607 |
| (4) | 0.707 |
| (5) | 1.933 |
| (6) | 0.344 |
| (7) | 2.481 |
| (8) | 0.036 |
| (9) | 1.584 |
| (10) | 0.639 |
| (11) | 1.728 |
| (12) | 0.723 |
| (13) | 0.407 |

TABLE 15

| | Wide angle position | Telephoto position |
|---|---|---|
| Third numerical embodiment | 0.140 mm | 0.254 mm |

Figure 9:
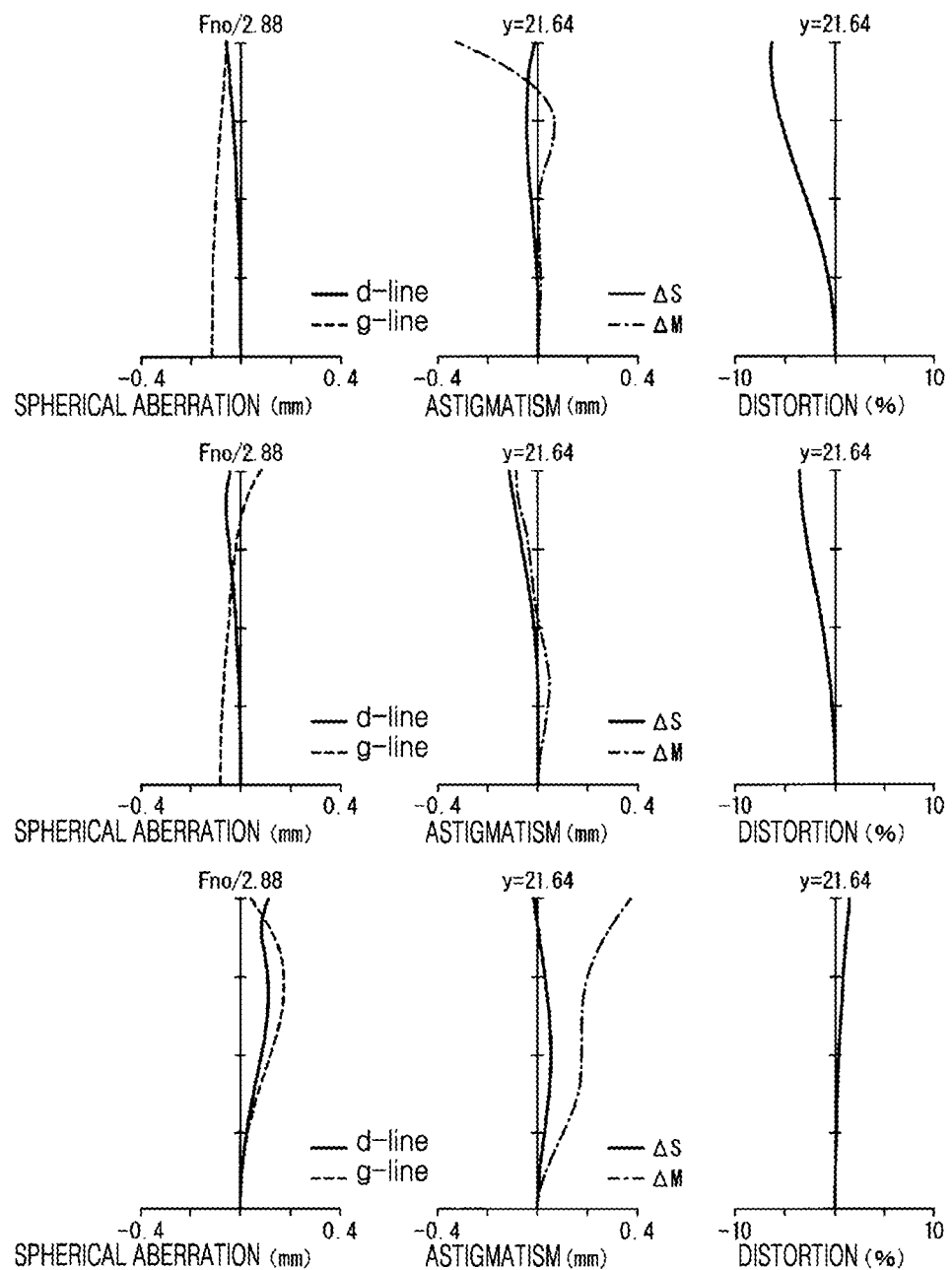
FIG. 9 illustrates spherical aberration, astigmatism, and distortion at the wide angle position W, the middle position M, and the telephoto position tin the zoom lens of the third numerical embodiment.
Figure 10A:
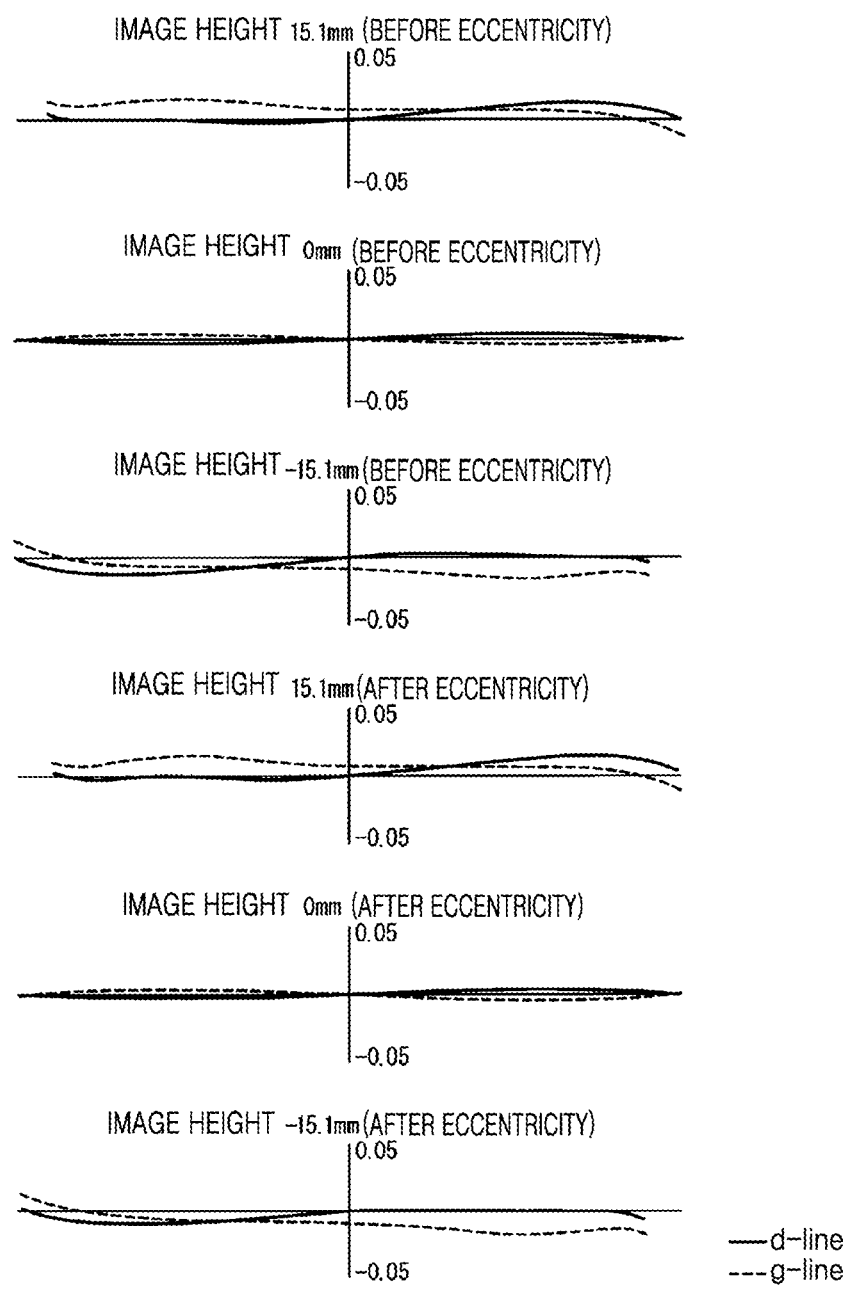
FIG. 10A illustrates lateral aberration at the wide angle position in the zoom lens of the third numerical embodiment.
Figure 10B:
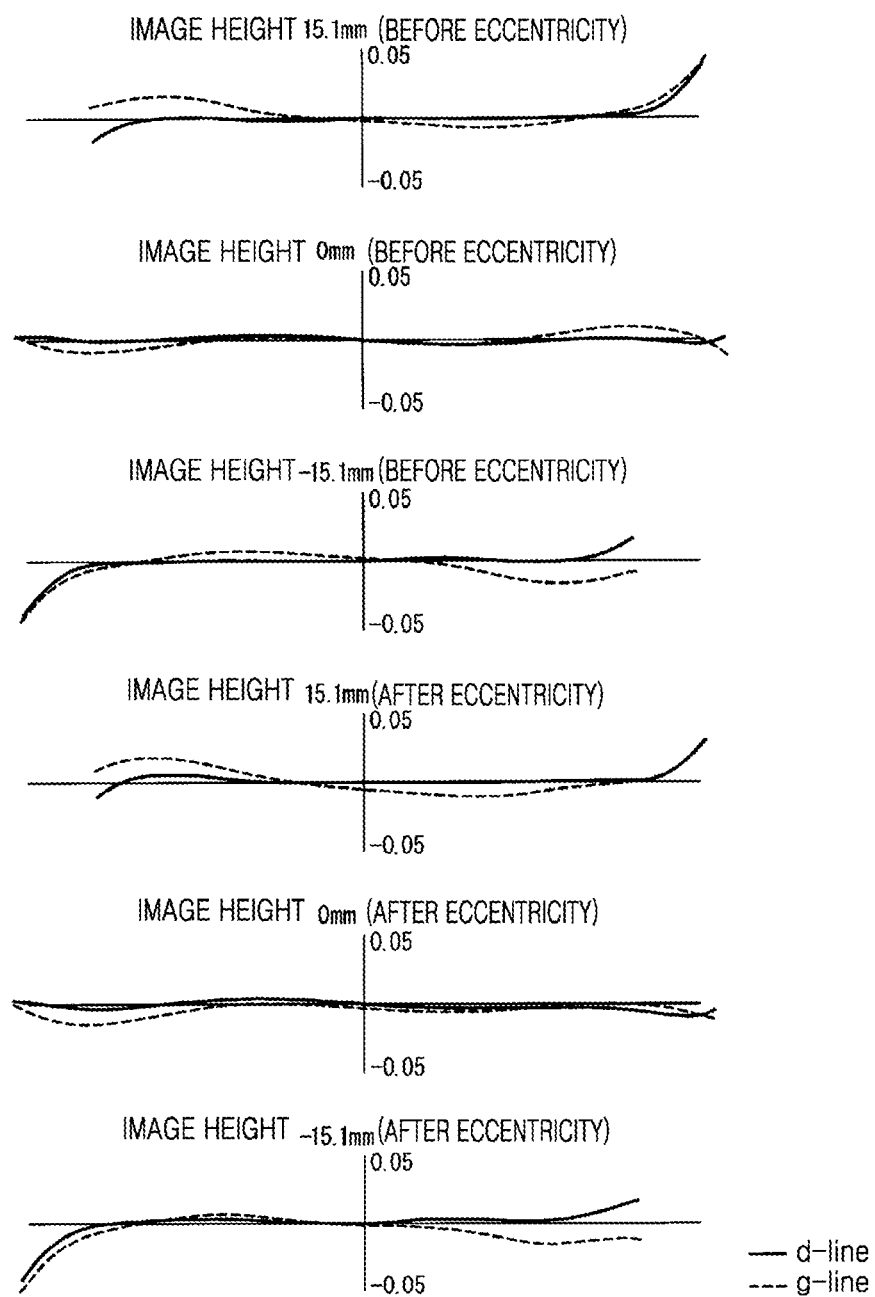
FIG. 10B illustrates lateral aberration at the telephoto position in the zoom lens of the third numerical embodiment.

Longitudinal aberration diagrams (each including a spherical aberration diagram, an astigmatism diagram, and a distortion diagram) of the zoom lens of the third numerical embodiment constructed as described above are illustrated in FIG. 9. Also, lateral aberration diagrams of the zoom lens of the third numerical embodiment at the wide angle position and the telephoto position are illustrated in FIGS. 10A and 10B. Also, the way in which FIGS. 9, 10A, and 10B are constructed is the same as that used to construct FIGS. 3, 4A, and 4B.

The zoom lens of the third numerical embodiment satisfies the above condition as shown in Tables 11 through 15. Also, it was found that in the zoom lens of the third numerical embodiment, each aberration was satisfactorily corrected as shown in FIGS. 9, 10A, and 10B.

Fourth Numerical Embodiment

Figure 11:
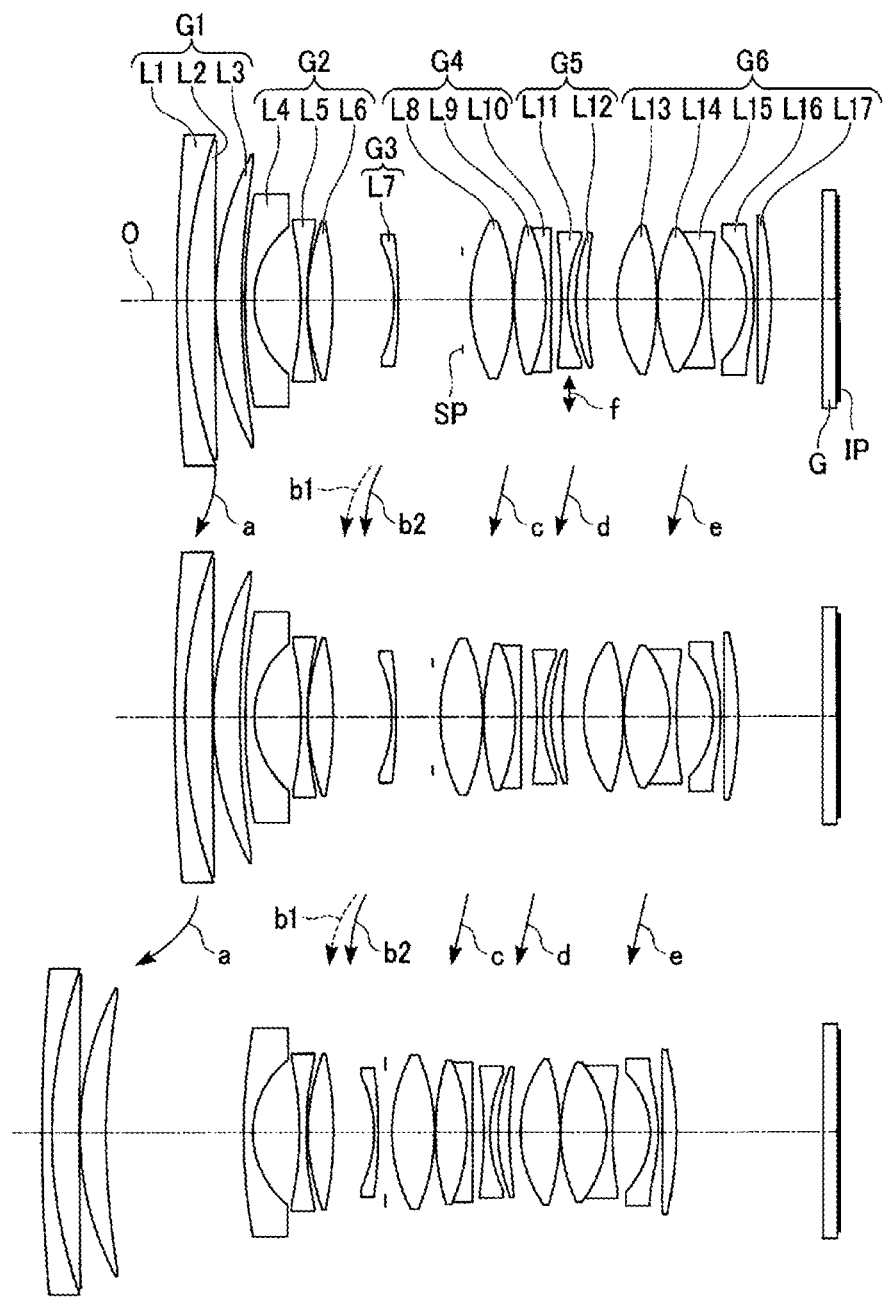
FIG. 11 illustrates an arrangement of lenses at the wide angle position W, the middle position M, and the telephoto position T in a zoom lens of a fourth numerical embodiment.

A configuration of a zoom lens according to design data of a fourth numerical embodiment is illustrated in FIG. 11. Also, the zoom lens of the fourth numerical embodiment of FIG. 11 has the same lens configuration as that of the zoom lens of FIG. 1 and performs the same lens operations, such as zooming, focusing, and correction of blur, as those of the zoom lens of FIG. 1. Accordingly, in FIG. 11, the same elements as those of the zoom lens of FIG. 1 are denoted by the same reference numerals and a movement trajectory of each lens is indicated by the same arrow(s).

Design data of the zoom lens of the fourth numerical embodiment is as shown in Tables 16 through 20. Also, the way in which elements of Tables 16 through 20 were determined and arranged is the same as that used to determine and arrange elements of Tables 1 through 5.

TABLE 16

| Surface number | r | d | nd | vd |
|---|---|---|---|---|
| 1 | 410.249 | 2.000 | 1.84667 | 23.79 |
| 2 | 106.148 | 5.804 | 1.75500 | 52.33 |
| 3 | 1558.435 | 0.150 | | |
| 4 | 63.478 | 5.852 | 1.77250 | 49.61 |
| 5 | 170.081 | d5 | | |
| 6 | 145.472 | 1.680 | 1.88300 | 40.81 |
| 7 | 20.099 | 10.207 | | |
| 8* | −67.326 | 1.500 | 1.73960 | 49.10 |
| 9* | 69.119077 | 0.150 | | |
| 10 | 50.219 | 5.586 | 1.84667 | 23.79 |
| 11 | −72.501 | d11 | | |
| 12 | −27.754 | 0.900 | 1.61800 | 63.39 |
| 13 | −103.978 | d13 | | |
| 14 | ∞ | 1.700 | | |
| 15* | 30.431 | 9.420 | 1.58930 | 60.60 |
| 16* | −37.992 | 0.215 | | |
| 17 | 54.163 | 6.665 | 1.49700 | 81.61 |
| 18 | −37.033 | 1.250 | 1.80518 | 25.46 |
| 19 | −826.9222 | d19 | | |
| 20* | −111.0541 | 1.300 | 1.69012 | 52.90 |
| 21* | 27.435489 | 1.785 | | |
| 22 | 38.534154 | 2.402 | 1.76182 | 26.61 |
| 23 | 83.070545 | d23 | | |
| 24 | 27.19999 | 8.518 | 1.49700 | 81.61 |
| 25 | −50.63972 | 0.150 | | |
| 26 | 36.352 | 9.930 | 1.49700 | 81.61 |
| 27 | −23.183 | 1.300 | 1.80450 | 39.64 |
| 28 | 85.237 | 7.923 | | |
| 29* | −16.771 | 1.500 | 1.80470 | 40.90 |
| 30* | −37.356 | 0.627 | | |
| 31 | 8899.703 | 3.427 | 1.92287 | 20.88 |
| 32 | −64.758 | d32 | | |
| 33 | ∞ | 3.000 | 1.51680 | 64.20 |
| 34 | ∞ | 0.500 | | |

TABLE 17

Zoom magnification 2.74

| | Wide angle position | Middle position | Telephoto position |
|---|---|---|---|
| Focal length | 24.700 | 32.000 | 67.800 |
| F value | 2.88 | 2.88 | 2.88 |
| Half field angle (°) | 43.11 | 35.19 | 17.44 |
| image height | 21.640 | 21.640 | 21.640 |
| Lens total lengh | 142.895 | 143.296 | 172.180 |
| bF (in air) | 13.478 | 20.626 | 34.154 |
| d 5 | 0.800 | 1.201 | 30.084 |
| d 11 | 13.432 | 12.754 | 8.716 |
| d 13 | 13.519 | 7.872 | 1.400 |
| d 19 | 2.318 | 3.021 | 2.421 |
| d 23 | 6.386 | 4.859 | 2.443 |
| d 32 | 11.000 | 18.148 | 31.676 |

TABLE 18

| Surface number | K | a4 | a6 | a8 | a10 |
|---|---|---|---|---|---|
| 8 | 0 | 2.76313 E−06 | −1.23012E−12 | 9.72439 E−12 | −1.51949E−14 |
| 9 | 0 | −2.63531 E−06 | −1.32651E−08 | −2.6295 E−12 | 3.45098E−15 |
| 15 | 0 | −9.2803 E−06 | −7.23573E−10 | −2.8806 E−12 | −2.52168E−14 |
| 16 | 0 | 6.26529 E−06 | −1.17112E−08 | 3.08738 E−11 | −4.79935E−14 |
| 20 | 0 | −4.39022 E−06 | 5.44312E−09 | 3.34069 E−11 | −4.81091E−14 |
| 21 | 0 | −1.39931 E−05 | 1.87772E−08 | −3.7064 E−11 | 4.96602E−14 |
| 29 | 0 | 5.10110 E−06 | 1.34168E−07 | −3.5491 E−10 | 2.55403E−12 |
| 30 | 0 | 1.64569 E−05 | 6.98009E−08 | −1.5002 E−10 | 2.22992E−13 |

TABLE 19

| Formula | Fourth numerical embodiment |
|---|---|
| (1) | 2.073 |
| (2) | 0.837 |
| (3) | 81.607 |
| (4) | 0.720 |
| (5) | 1.933 |
| (6) | 0.986 |
| (7) | 2.482 |
| (8) | 0.036 |
| (9) | 1.591 |
| (10) | 0.641 |
| (11) | 1.735 |
| (12) | 0.722 |
| (13) | 0.409 |

TABLE 20

| | Wide angle position | Telephoto position |
|---|---|---|
| Fourth numerical embodiment | 0.140 mm | 0.254 mm |

Figure 12:
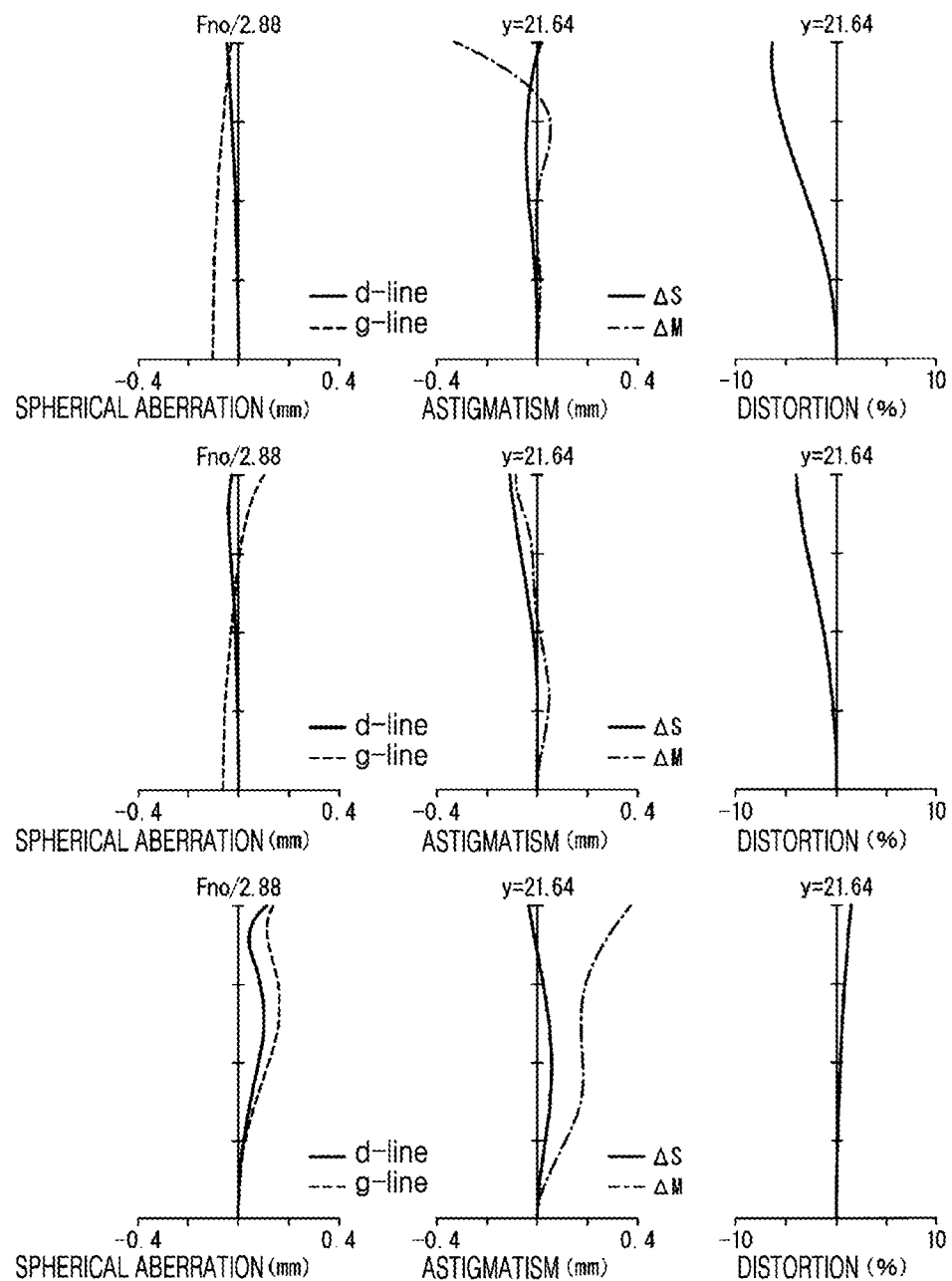
FIG. 12 illustrates spherical aberration, astigmatism, and distortion at the wide angle position W, the middle position M, and the telephoto position T in the zoom lens of the fourth numerical embodiment.
Figure 13A:
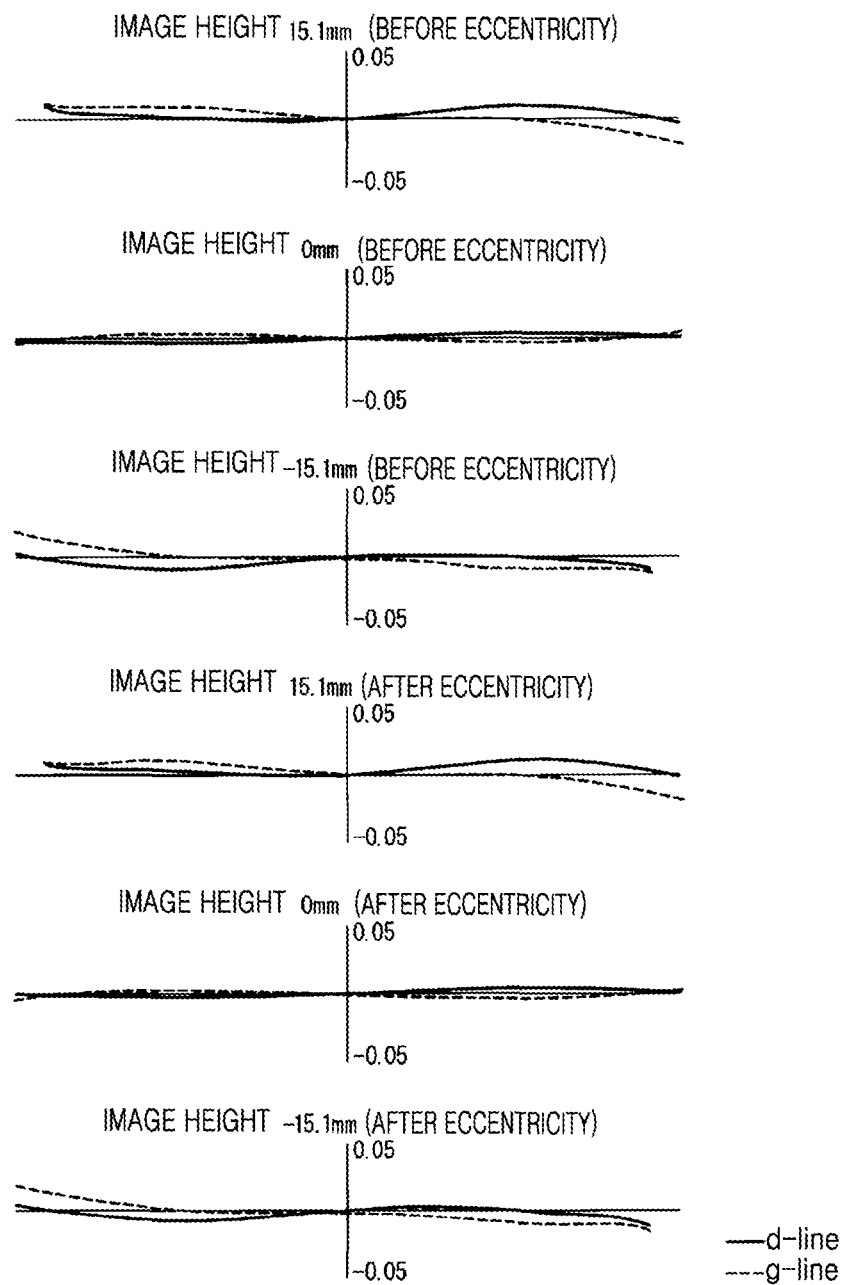
FIG. 13A illustrates lateral aberration at the wide angle position in the zoom lens of the fourth numerical embodiment.
Figure 13B:
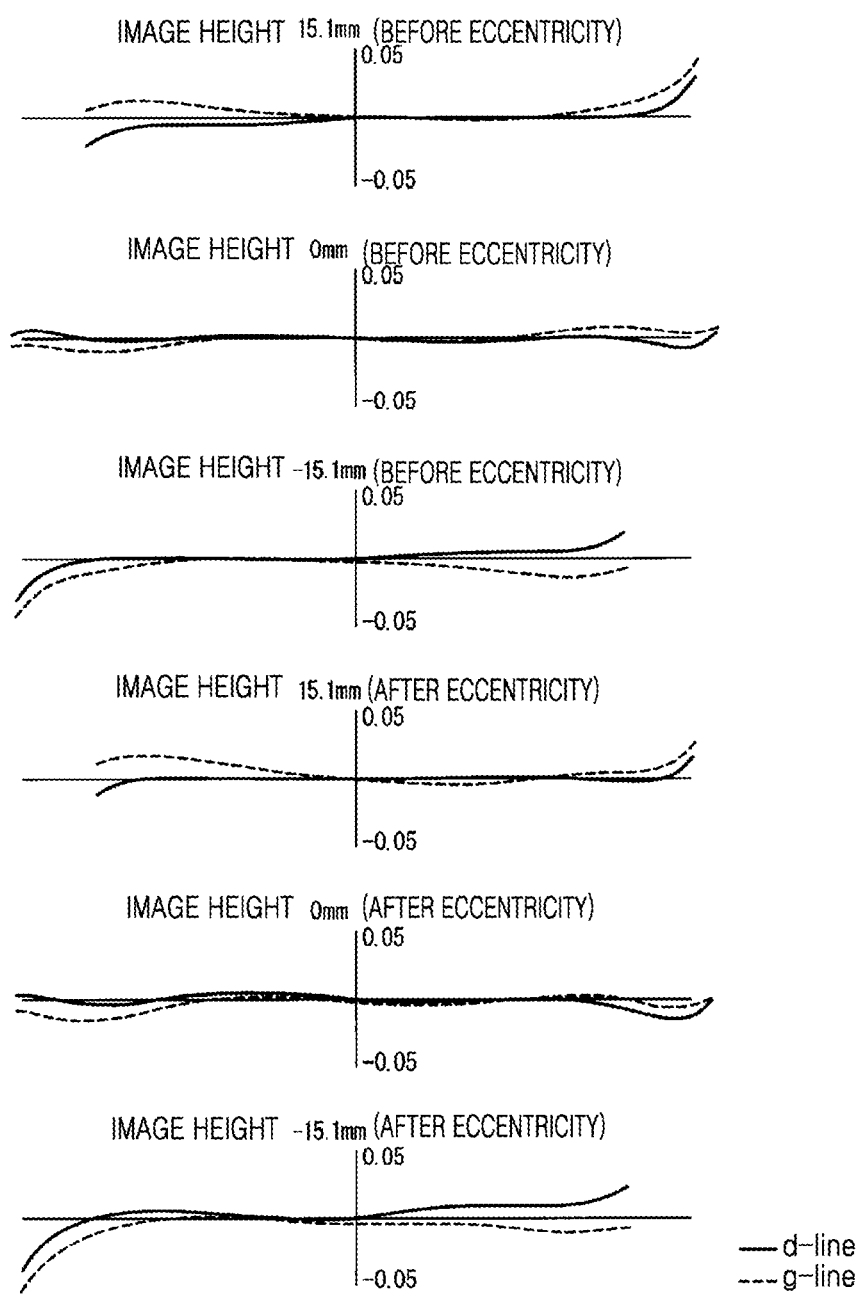
FIG. 13B illustrates lateral aberration at the telephoto position in the zoom lens of the fourth numerical embodiment.

Longitudinal aberration diagrams (each including a spherical aberration diagram, an astigmatism diagram, and a distortion diagram) of the zoom lens of the fourth numerical embodiment constructed as described above are illustrated in FIG. 12. Also, lateral aberration diagrams of the zoom lens of the fourth numerical embodiment at the wide angle position and the telephoto position are illustrated in FIGS. 13A and 13B. Also, the way in which FIGS. 12, 13A, and 13B are formed is the same as that used to form FIGS. 3, 4A, and 4B.

The zoom lens of the fourth numerical embodiment satisfies the above condition as shown in Tables 16 through 20. Also, it was found that in the zoom lens of the fourth numerical embodiment, each aberration was satisfactorily corrected as shown in FIGS. 12, 13A, and 13B.

Fifth Numerical Embodiment

Figure 14:
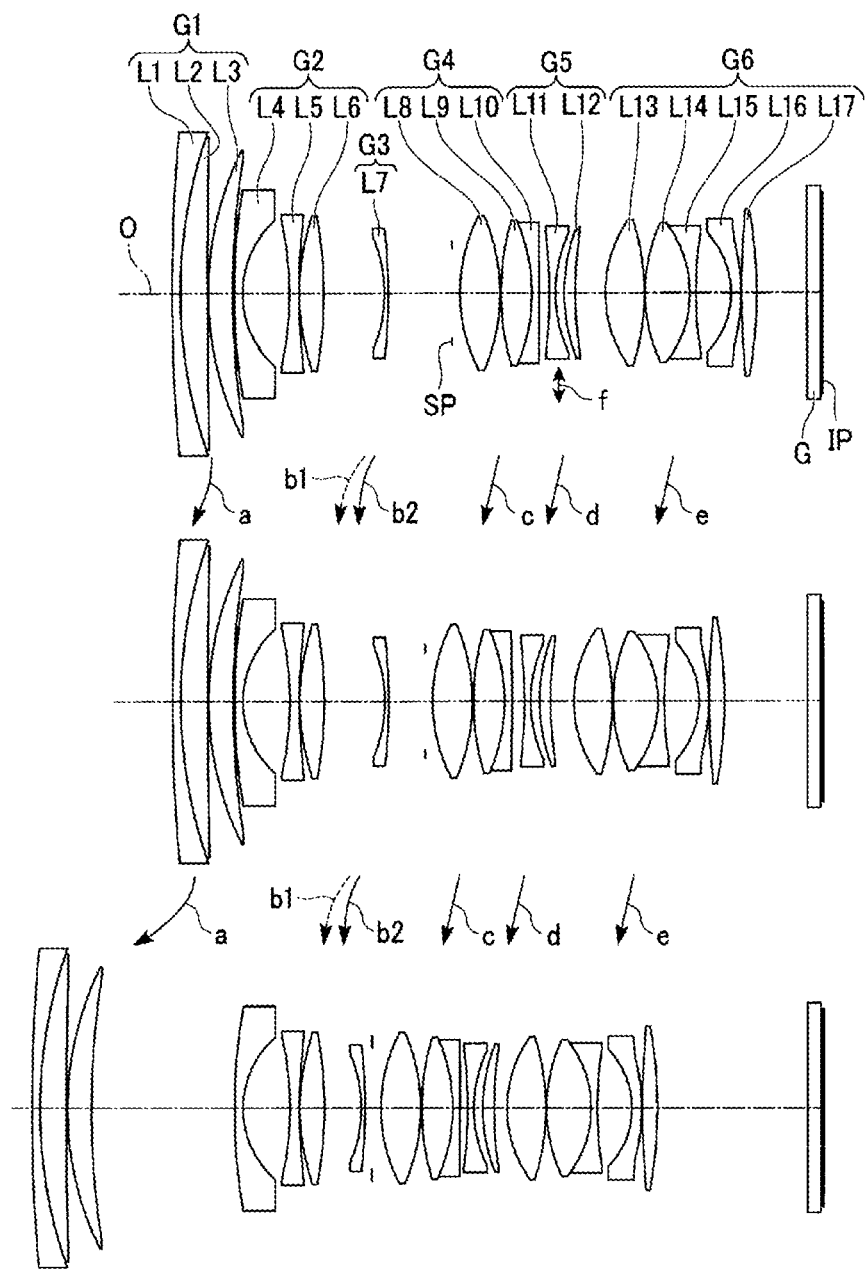
FIG. 14 illustrates an arrangement of lenses at the wide angle position W, the middle position M, and the telephoto position T in a zoom lens of a fifth numerical embodiment.

A configuration of a zoom lens according to design data of a fifth numerical embodiment is illustrated in FIG. 14. Also, the zoom lens of the fifth numerical embodiment of FIG. 14 has the same lens configuration as that of the zoom lens of FIG. 1 and performs the same lens operations, such as zooming, focusing, and correction of blur, as those of the zoom lens of FIG. 1. Accordingly, in FIG. 14, the same elements as those of the zoom lens of FIG. 1 are denoted by the same reference numerals and a movement trajectory of each lens is indicated by the same arrow.

Design data of the zoom lens of the fifth numerical embodiment is as shown in Tables 21 through 25. Also, the way in which elements of Tables 21 through 25 were determined and arranged is the same as that used to determine and arrange elements of Tables 1 through 5.

TABLE 21

| Surface number | r | d | nd | vd |
|---|---|---|---|---|
| 1 | 344.080 | 2.000 | 1.84667 | 23.79 |
| 2 | 111.700 | 5.788 | 1.75500 | 52.33 |
| 3 | 5889.527 | 0.150 | | |
| 4 | 69.887 | 4.927 | 1.77250 | 49.61 |
| 5 | 160.688 | d5 | | |
| 6 | 138.447 | 1.680 | 1.88300 | 40.81 |
| 7 | 20.004 | 10.439 | | |
| 8* | −70.001 | 2.179 | 1.73960 | 49.10 |
| 9* | 95.893231 | 0.150 | | |
| 10 | 53.222 | 5.654 | 1.84667 | 23.79 |
| 11 | −76.465 | d11 | | |
| 12 | −31.333 | 0.900 | 1.61800 | 63.39 |
| 13 | −213.744 | d13 | | |
| 14 | ∞ | 1.700 | | |
| 15* | 30.389 | 9.039 | 1.58930 | 60.60 |
| 16* | −39.350 | 0.150 | | |
| 17 | 56.635 | 6.634 | 1.49700 | 81.61 |
| 18 | −36.235 | 1.944 | 1.80518 | 25.46 |
| 19 | −866.9112 | d19 | | |
| 20* | −172.2239 | 1.722 | 1.69012 | 52.90 |
| 21* | 25.234069 | 1.628 | | |
| 22 | 34.264081 | 2.431 | 1.76182 | 26.61 |
| 23 | 65.479146 | d23 | | |
| 24 | 26.580135 | 8.553 | 1.49700 | 81.61 |
| 25 | −52.89567 | 0.150 | | |
| 26 | 33.652 | 9.749 | 1.49700 | 81.61 |
| 27 | −24.842 | 1.300 | 1.80450 | 39.64 |
| 28 | 69.167 | 8.296 | | |
| 29* | −16.988 | 1.500 | 1.80470 | 40.90 |
| 30* | −39.105 | 0.267 | | |
| 31 | 200.000 | 3.586 | 1.92287 | 20.88 |
| 32 | −85.106 | d32 | | |
| 33 | ∞ | 3.000 | 1.51680 | 64.20 |
| 34 | ∞ | 0.500 | | |

TABLE 22

| Zoom magnification 2.74 | | | |
|---|---|---|---|
| | Wide angle position | Middle position | Telephoto position |
| Focal length | 24.700 | 32.000 | 67.800 |
| F value | 2.90 | 2.90 | 2.90 |
| Half field angle (°) | 42.76 | 35.130 | 17.440 |
| Image height | 21.640 | 21.640 | 21.640 |
| Lens total length | 143.950 | 144.212 | 174.785 |
| bF (in air) | 13.611 | 20.641 | 35.408 |
| d 5 | 0.800 | 1.063 | 31.631 |
| d 11 | 13.131 | 12.885 | 8.288 |
| d 13 | 14.095 | 8.124 | 1.400 |
| d 19 | 1.907 | 2.795 | 1.561 |
| d 23 | 6.868 | 5.167 | 2.960 |
| d 32 | 11.133 | 18.163 | 32.930 |

TABLE 23

| Surface number | K | a4 | a6 | a8 | a10 |
|---|---|---|---|---|---|
| 8 | 0 | 1.75313 E−06 | −1.17541 E−08 | 1.2399 E−11 | −2.8817 E−14 |
| 9 | 0 | −3.0225 E−06 | −1.23211 E−08 | −2.1519 E−13 | −1.0682 E−14 |
| 15 | 0 | −9.8371 E−06 | 2.26228 E−10 | −2.8449 E−12 | −4.5550 E−14 |
| 16 | 0 | 5.19442 E−06 | −1.02540 E−08 | 2.9866 E−11 | −7.0603 E−14 |
| 20 | 0 | −4.1005 E−06 | 4.61859 E−09 | 2.36372 E−11 | −1.6530 E−14 |
| 21 | 0 | −1.4063 E−05 | 1.49691 E−08 | −4.7264 E−11 | 9.38430 E−14 |
| 29 | 0 | 3.02333 E−06 | 1.17163 E−07 | −3.7156 E−10 | 2.32158 E−12 |
| 30 | 0 | 1.62069 E−05 | 6.49708 E−08 | −1.4279 E−10 | 2.11088 E−13 |

TABLE 24

| Formula | Fifth numerical embodiment |
|---|---|
| (1) | 1.985 |
| (2) | 0.882 |
| (3) | 81.607 |
| (4) | 0.751 |
| (5) | 1.933 |
| (6) | 0.403 |
| (7) | 2.401 |
| (8) | 0.036 |
| (9) | 1.800 |
| (10) | 0.750 |
| (11) | 1.870 |
| (12) | 0.721 |
| (13) | 0.420 |

TABLE 25

| | Wide angle position | Telephoto position |
|---|---|---|
| Fifth numerical embodiment | 0.140 mm | 0.249 mm |

Figure 15:
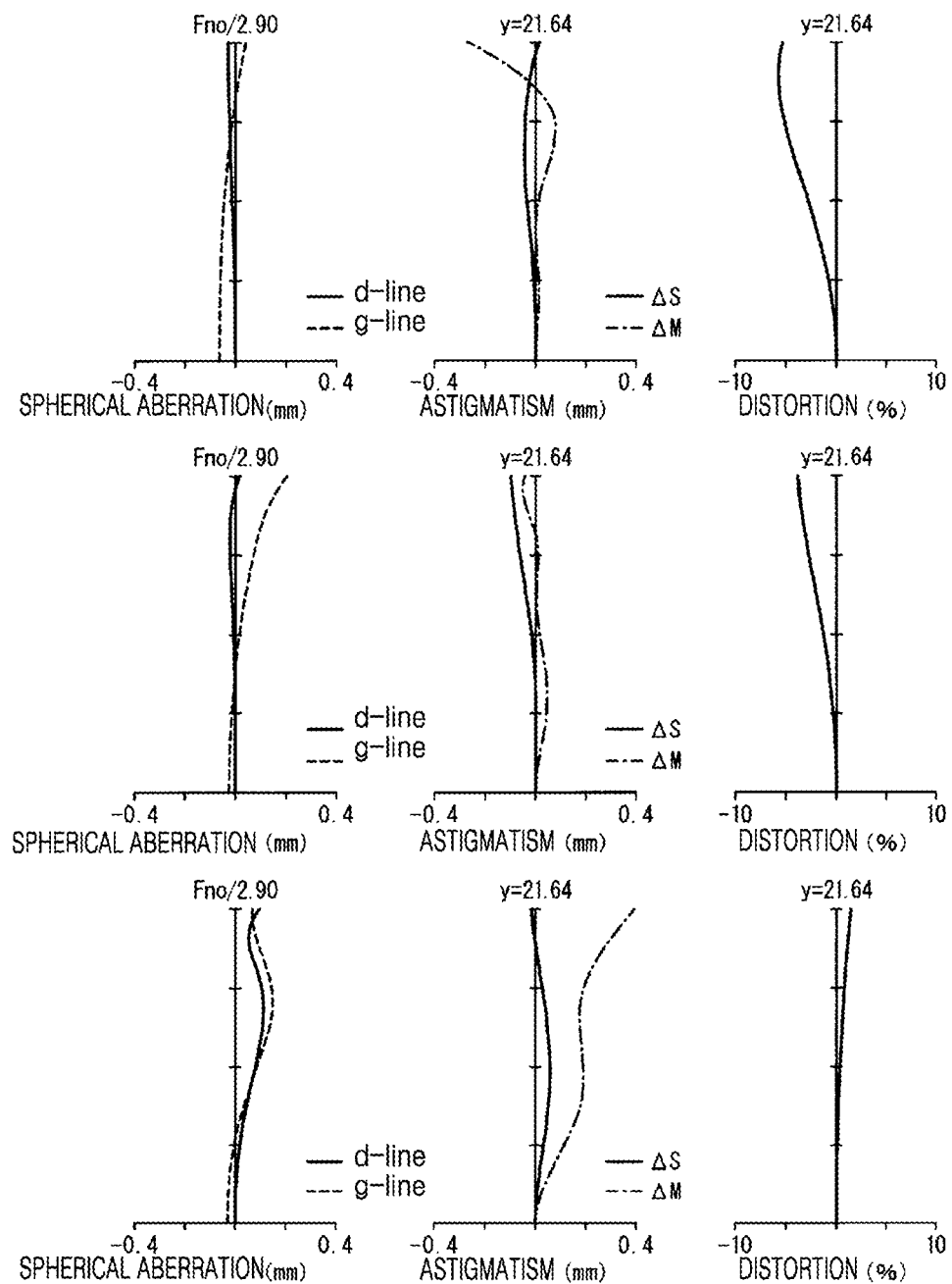
FIG. 15 illustrates spherical aberration, astigmatism, and distortion at the wide angle position W, the middle position M, and the telephoto position T in the zoom lens of the fifth numerical embodiment.
Figure 16A:
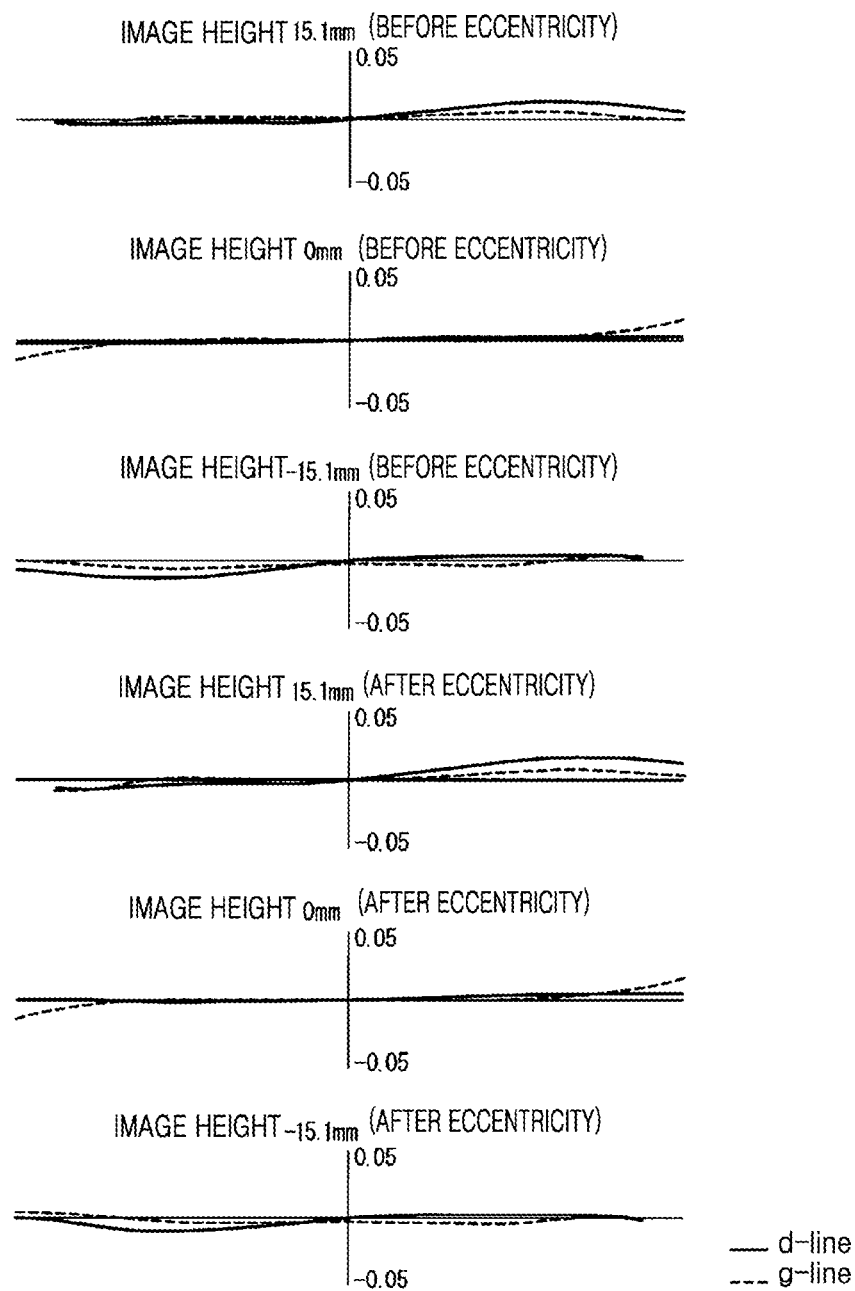
FIG. 16A illustrates lateral aberration at the wide angle position in the zoom lens of the fifth numerical embodiment.
Figure 16B:
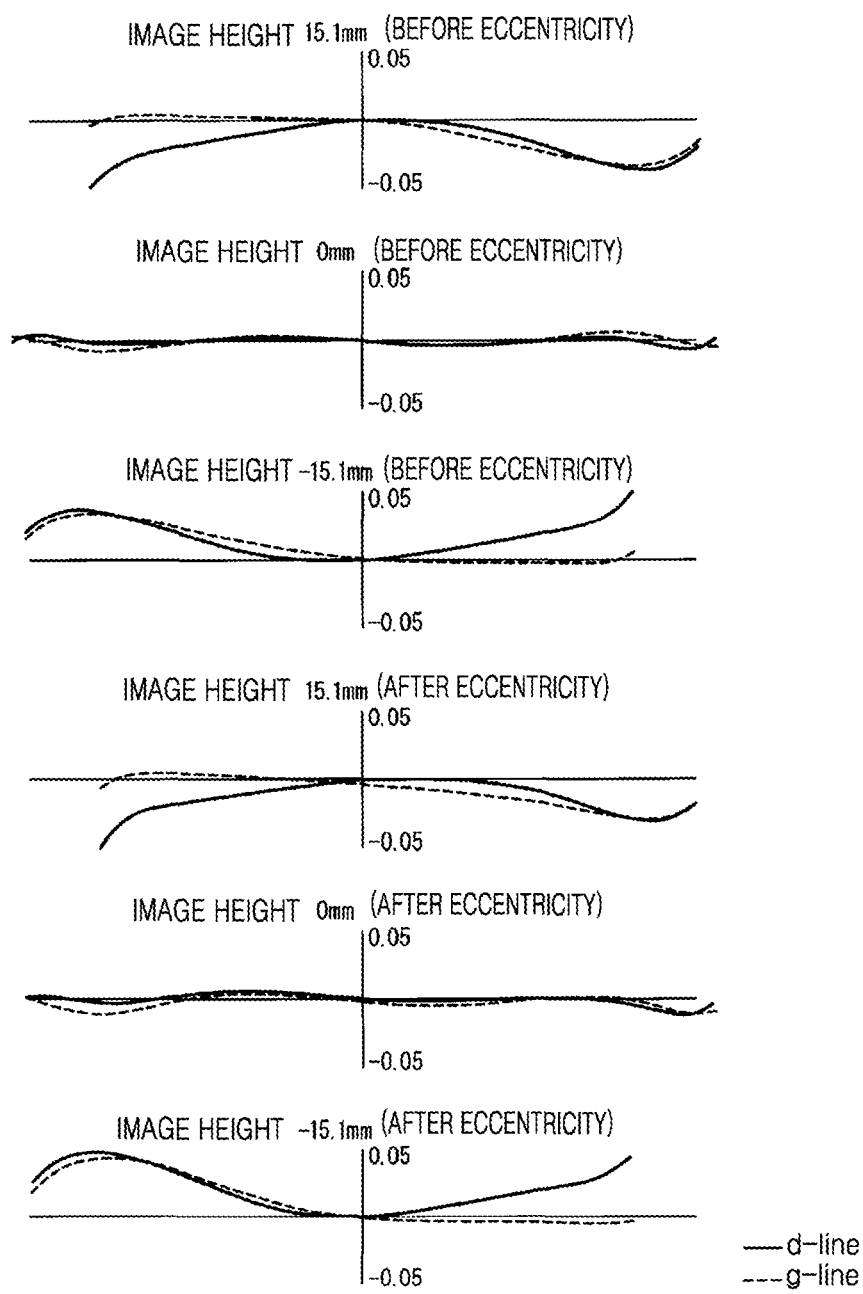
FIG. 16B illustrates lateral aberration at the telephoto position in the zoom lens of the fifth numerical embodiment.

Longitudinal aberration diagrams (each including a spherical aberration diagram, an astigmatism diagram, and a distortion diagram) of the zoom lens of the fifth numerical embodiment constructed as described above are illustrated in FIG. 15. Also, lateral aberration diagrams of the zoom lens of the fifth numerical embodiment at the wide angle position and the telephoto position are illustrated in FIGS. 16A and 16B. Also, the way in which FIGS. 15, 16A, and 16B are formed is the same as that used to form FIGS. 3, 4A, and 4B.

The zoom lens of the fifth numerical embodiment satisfies the above condition as shown in Tables 21 through 25. Also, it was found that in the zoom lens of the fifth numerical embodiment, each aberration was satisfactorily corrected as shown in FIGS. 15, 16A, and 16B.

Sixth Numerical Embodiment

Figure 17:
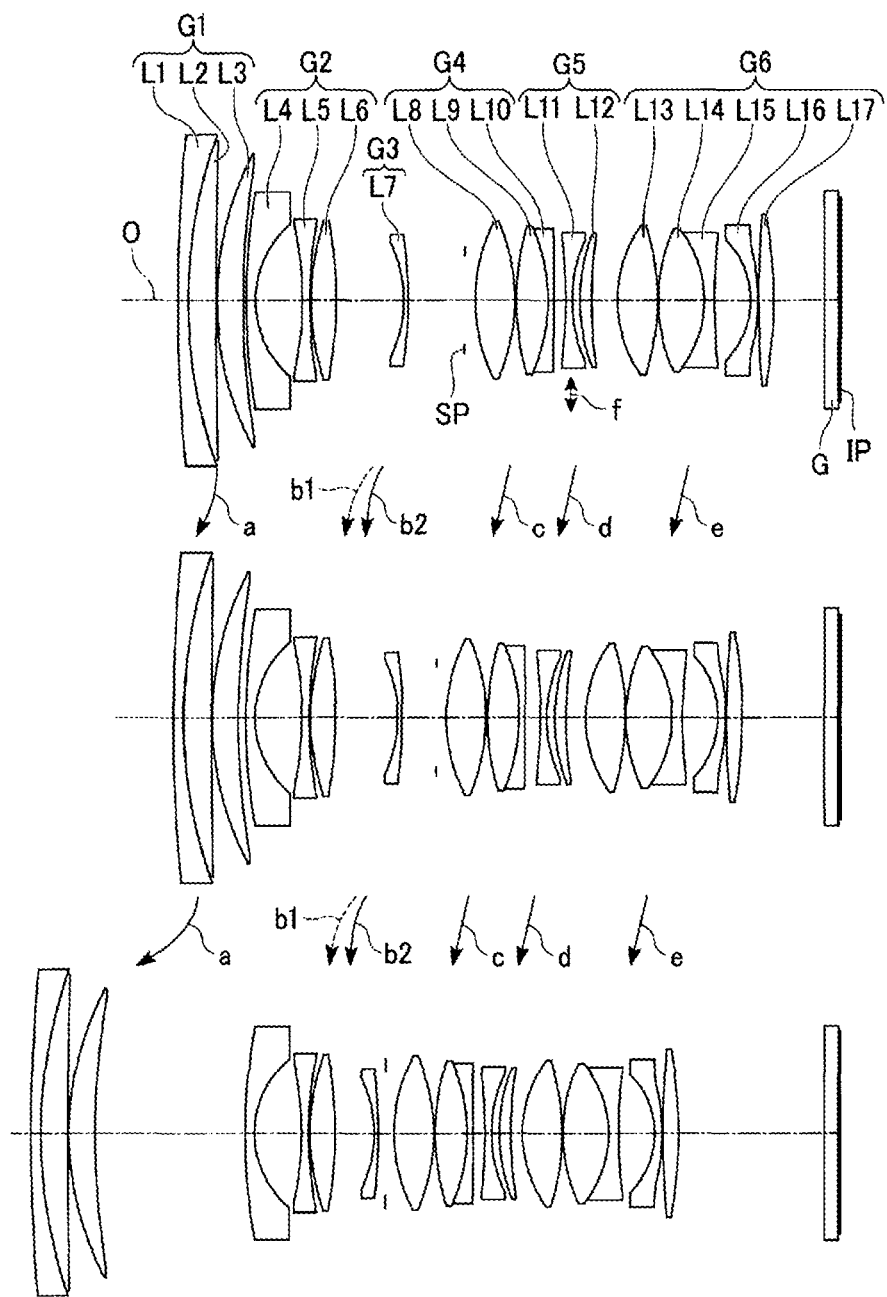
FIG. 17 illustrates an arrangement of lenses at the wide angle position W, the middle position M, and the telephoto position T in a zoom lens of a sixth numerical embodiment.

A configuration of a zoom lens according to design data of a sixth numerical embodiment is illustrated in FIG. 17. Also, the zoom lens of the fifth numerical embodiment of FIG. 17 has the same lens configuration as that of the zoom lens of FIG. 1 and performs the same lens operation such as zooming, focusing, and correction of blur as that of the zoom lens of FIG. 1. Accordingly, in FIG. 17, the same elements as those of the zoom lens of FIG. 1 are denoted by the same reference numerals, and a movement trajectory of each lens is indicated by the same arrow(s).

Design data of the zoom lens of the sixth numerical embodiment is as shown in Tables 26 through 30. Also, the way in which elements of Tables 26 through 30 were determined and arranged is the same as that used to determine and arrange elements of Tables 1 through 5.

TABLE 26

| Surface number | r | d | nd | v d |
|---|---|---|---|---|
| 1 | 364.788 | 2.000 | 1.84667 | 23.79 |
| 2 | 97.814 | 6.232 | 1.75500 | 52.33 |
| 3 | 1409.749 | 0.150 | | |
| 4 | 65.993 | 5.530 | 1.77250 | 49.61 |
| 5 | 170.103 | d5 | | |
| 6 | 146.466 | 1.680 | 1.88300 | 40.81 |
| 7 | 20.486 | 10.086 | | |
| 8* | −70.742 | 1.500 | 1.73960 | 49.10 |
| 9* | 68.864543 | 0.150 | | |
| 10 | 49.211 | 5.516 | 1.84667 | 23.79 |
| 11 | −77.559 | d11 | | |
| 12 | −27.180 | 0.800 | 1.61800 | 63.39 |
| 13 | −105.259 | d13 | | |
| 14 | 8 | 1.700 | | |
| 15* | 30.191 | 8.649 | 1.58930 | 60.60 |
| 16* | −37.061 | 0.150 | | |
| 17 | 53.561 | 6.554 | 1.49700 | 81.61 |
| 18 | −38.284 | 1.250 | 1.80518 | 25.46 |
| 19 | −964.6768 | d19 | | |
| 20* | −89.56385 | 1.300 | 1.69012 | 52.90 |
| 21* | 28.871572 | 1.692 | | |
| 22 | 42.160775 | 2.399 | 1.76182 | 26.61 |
| 23 | 103.6052 | d23 | | |
| 24 | 27.92224 | 8.431 | 1.49700 | 81.61 |
| 25 | −49.22889 | 0.150 | | |
| 26 | 37.985 | 9.872 | 1.49700 | 81.61 |
| 27 | −22.884 | 2.115 | 1.80450 | 39.64 |
| 28 | 134.154 | 7.504 | | |
| 29* | −16.983 | 1.500 | 1.80470 | 40.90 |
| 30* | −39.922 | 0.150 | | |
| 31 | 200.000 | 2.984 | 1.92287 | 20.88 |
| 32 | −126.480 | d32 | | |
| 33 | 8 | 3.000 | 1.51680 | 64.20 |
| 34 | 8 | 0.500 | | |

TABLE 27

Zoom magnification 2.74

| | Wide angle position | Middle position | Telephoto position |
|---|---|---|---|
| Focal length | 24.700 | 32.000 | 67.800 |
| F value | 2.88 | 2.88 | 2.88 |
| Half field angle (°) | 43.06 | 35.11 | 17.43 |
| Image height | 21.640 | 21.640 | 21.640 |
| Lens total length | 139.821 | 140.615 | 170.059 |
| bF (in air) | 13.478 | 19.962 | 33.058 |
| d 5 | 0.803 | 1.597 | 31.040 |
| d 11 | 14.174 | 13.179 | 8.593 |
| d 13 | 12.347 | 7.361 | 1.400 |
| d 19 | 2.791 | 3.494 | 3.001 |
| d 23 | 5.162 | 3.956 | 1.900 |
| d 32 | 11.000 | 17.484 | 30.580 |

TABLE 28

| Surface number | K | a4 | a6 | a8 | a10 |
|---|---|---|---|---|---|
| 8 | 0 | 2.66431 E−06 | −1.34342 E−08 | 1.08782 E−11 | −2.08350 E−14 |
| 9 | 0 | −2.37050 E−06 | −1.44582 E−08 | −8.35392 E−13 | 1.10029 E−15 |
| 15 | 0 | −8.99310 E−06 | −1.50893 E−09 | −7.75352 E−12 | −1.24818 E−15 |
| 16 | 0 | 7.78428 E−06 | −1.33222 E−08 | 2.62300 E−11 | −2.31441 E−14 |
| 20 | 0 | −4.34118 E−06 | 3.85350 E−09 | 5.48069 E−11 | −1.26532 E−13 |
| 21 | 0 | −1.51641 E−05 | 2.22183 E−08 | −2.12158 E−11 | −3.56313 E−14 |
| 29 | 0 | 4.42230 E−06 | 1.34212 E−07 | −4.06441 E−10 | 2.45311 E−12 |
| 30 | 0 | 1.69995 E−05 | 6.8012 E−08 | −1.89032 E−10 | 2.89461 E−13 |

TABLE 29

| Formula | Sixth numerical embodiment |
|---|---|
| (1) | 2.055 |
| (2) | 0.793 |
| (3) | 81.607 |
| (4) | 0.731 |
| (5) | 1.933 |
| (6) | 0.225 |
| (7) | 2.401 |
| (8) | 0.032 |
| (9) | 1.626 |
| (10) | 0.677 |
| (11) | 1.810 |
| (12) | 0.717 |
| (13) | 0.399 |

TABLE 30

| | Wide angle position | Telephoto position |
|---|---|---|
| Sixth numerical embodiment | 0.142 mm | 0.254 mm |

Figure 18:
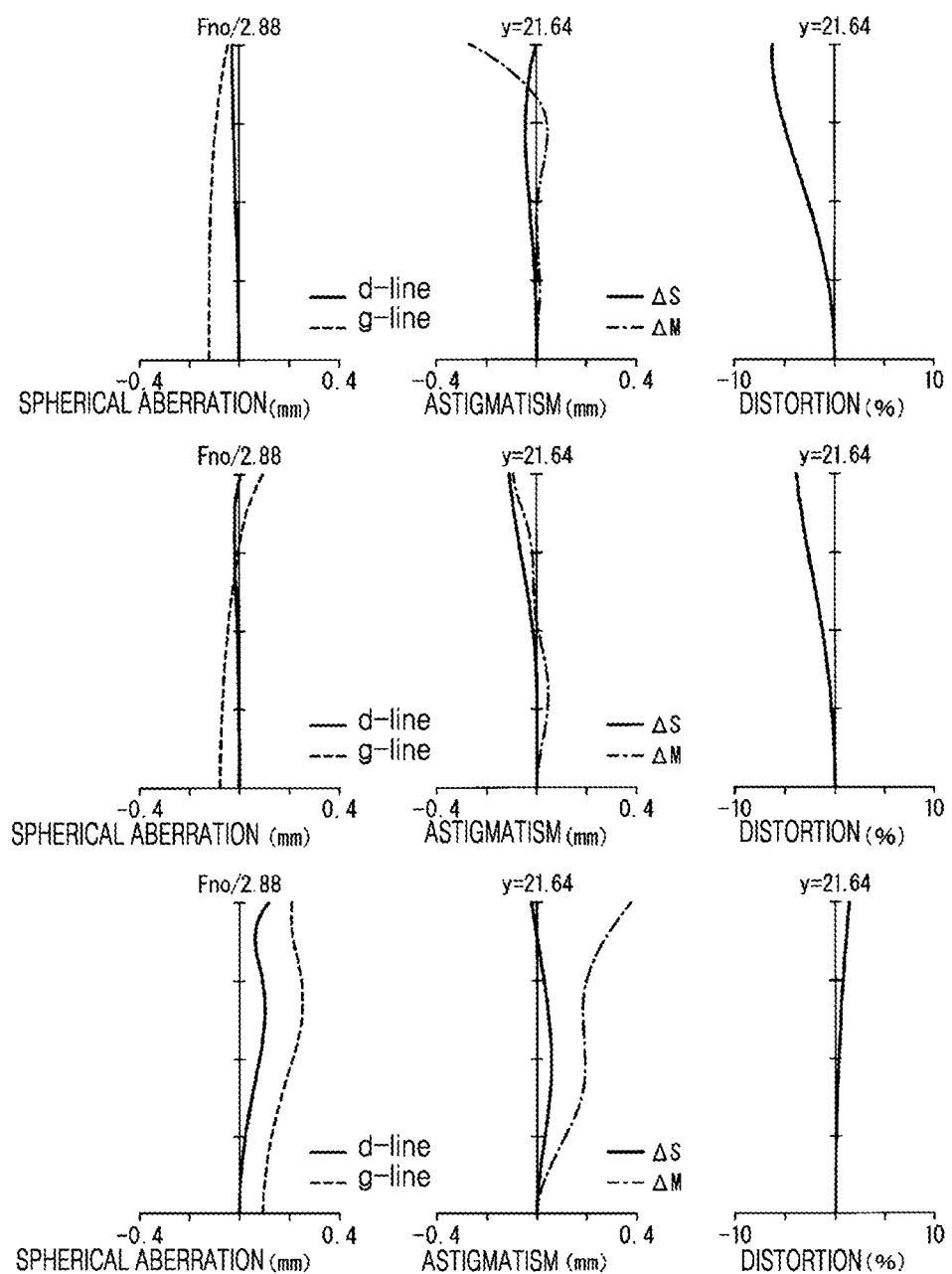
FIG. 18 illustrates spherical aberration, astigmatism, and distortion at the wide angle position W, the middle position M, and the telephoto position T in the zoom lens of the sixth numerical embodiment.
Figure 19A:
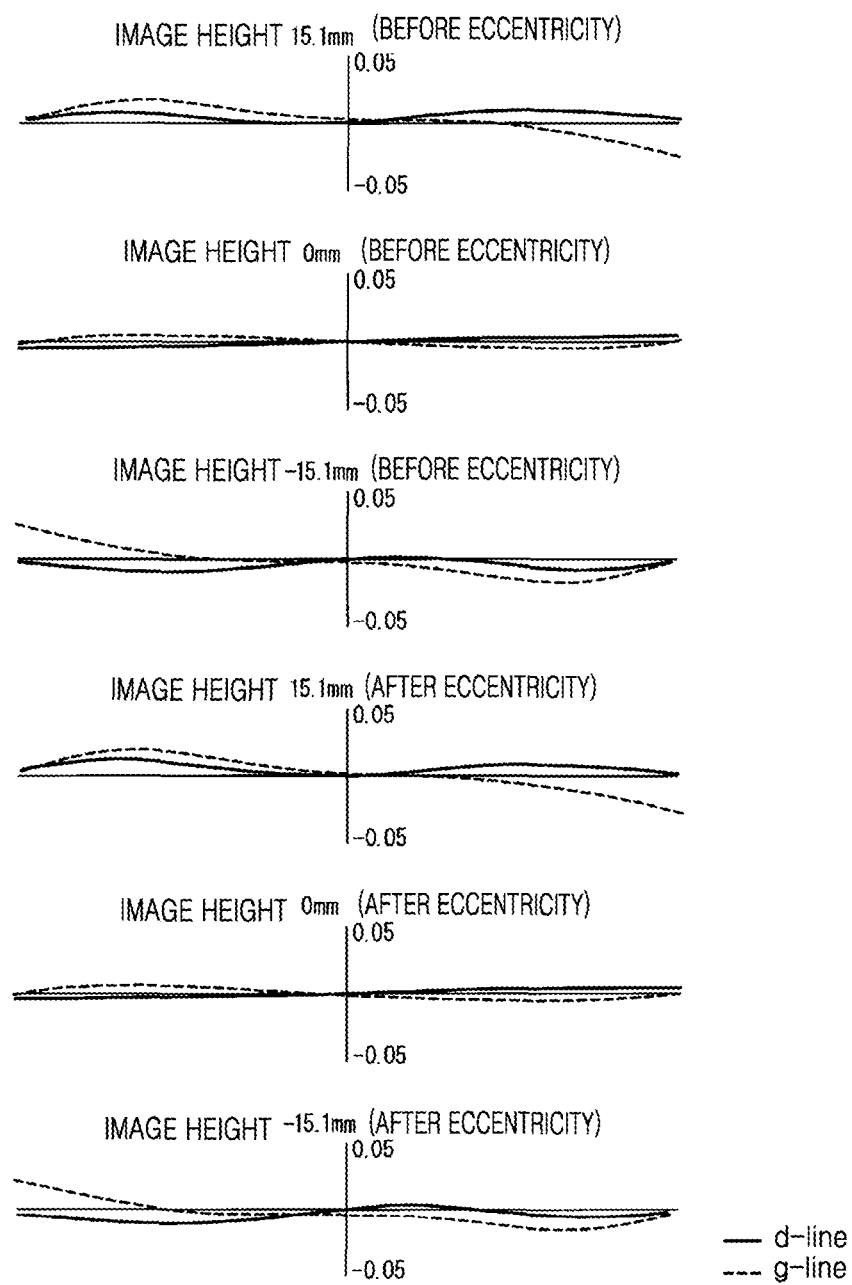
FIG. 19A illustrates lateral aberration at the wide angle position in the zoom lens of the sixth numerical embodiment.
Figure 19B:
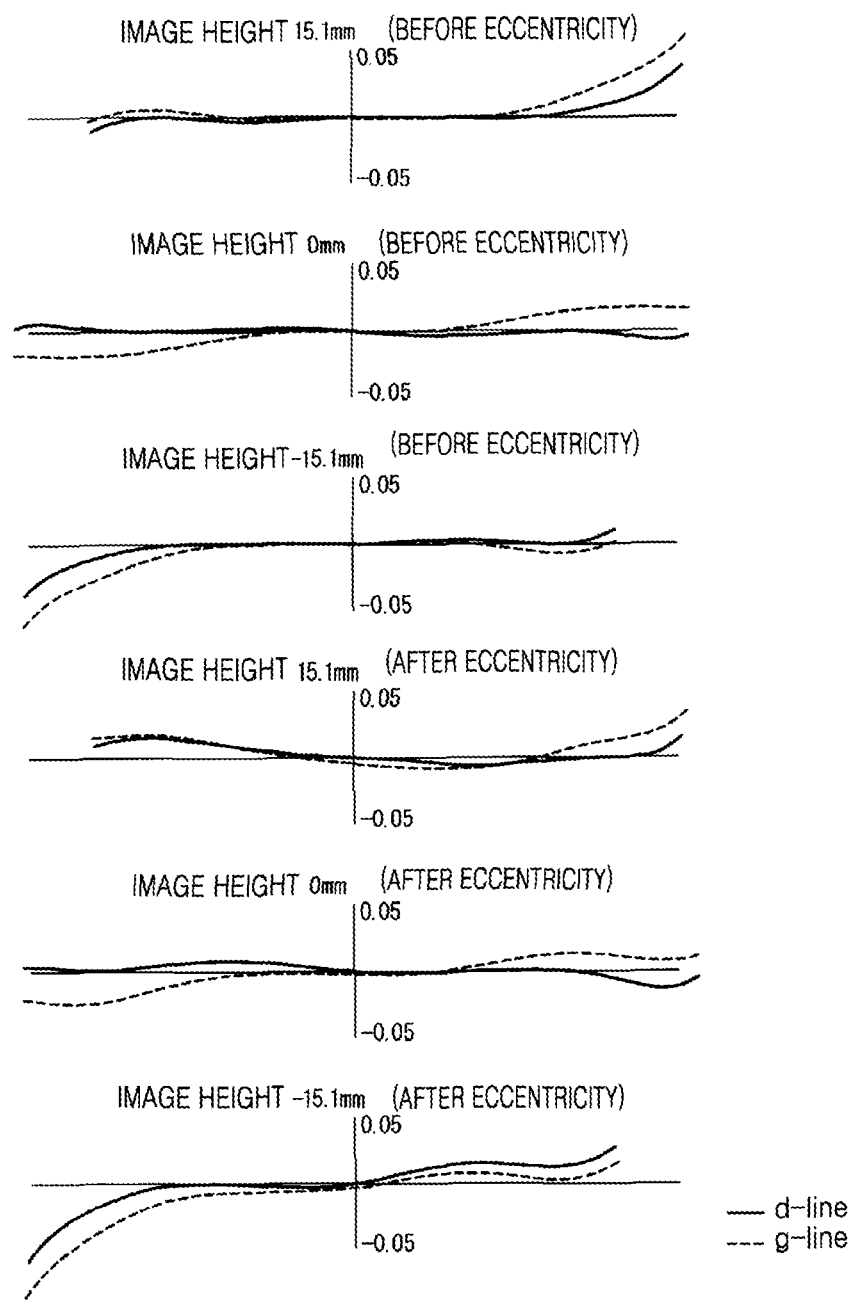
FIG. 19B illustrates lateral aberration at the telephoto position in the zoom lens of the sixth numerical embodiment.

Longitudinal aberration diagrams (each including a spherical aberration diagram, an astigmatism diagram, and a distortion diagram) of the zoom lens of the sixth numerical embodiment constructed as described above are illustrated in FIG. 18. Also, lateral aberration diagrams of the zoom lens of the sixth numerical embodiment at the wide angle position and the telephoto position are illustrated in FIGS. 19A and 19B. Also, the way in which FIGS. 18, 19A, and 19B are formed is the same as that used to form FIGS. 3, 4A, and 4B.

The zoom lens of the sixth numerical embodiment satisfies the above condition as shown in Tables 26 through 30. Also, it was found that in the zoom lens of the sixth numerical embodiment, each aberration was satisfactorily corrected as shown in FIGS. 18, 19A, and 19B.

Seventh Numerical Embodiment

Figure 20:
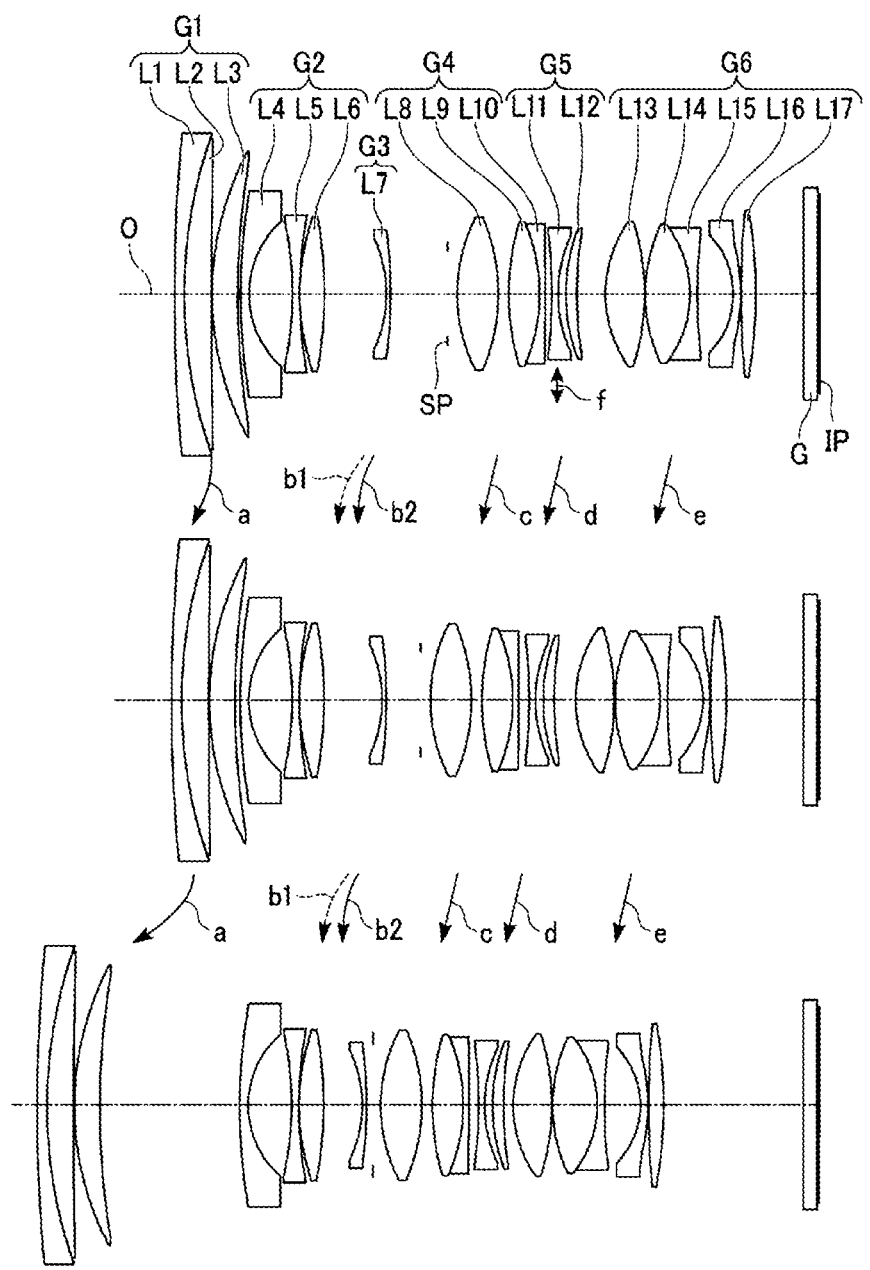
FIG. 20 illustrates an arrangement of lenses at the wide angle position W, the middle position M, and the telephoto position T in a zoom lens of a seventh numerical embodiment.

A configuration of a zoom lens according to design data of a seventh numerical embodiment is illustrated in FIG. 20. Also, the zoom lens of the seventh numerical embodiment of FIG. 20 has the same lens configuration as that of the zoom lens of FIG. 1 and performs the same lens operations, such as zooming, focusing, and correction of blur, as those of the zoom lens of FIG. 1. Accordingly, in FIG. 20, the same elements as those of the zoom lens of FIG. 1 are denoted by the same reference numerals, and a movement trajectory of each lens is indicated by the same arrow(s).

Design data of the zoom lens of the seventh numerical embodiment is as shown in Tables 31 through 35. Also, the way in which elements of Tables 31 through 35 were determined and arranged is the same as that used to determine and arrange elements of Tables 1 through 5.

TABLE 31

| Surface number | r | d | nd | ν d |
|---|---|---|---|---|
| 1 | 361.824 | 2.000 | 1.84667 | 23.79 |
| 2 | 98.040 | 6.582 | 1.75500 | 52.33 |
| 3 | 36456.645 | 0.150 | | |
| 4 | 68.600 | 5.096 | 1.77250 | 49.61 |
| 5 | 162.287 | d5 | | |
| 6 | 141.627 | 1.680 | 1.88300 | 40.81 |
| 7 | 21.011 | 9.879 | | |
| 8* | −63.843 | 1.500 | 1.73960 | 49.10 |
| 9* | 67.172042 | 0.150 | | |
| 10 | 50.698 | 5.439 | 1.84667 | 23.79 |
| 11 | −76.837 | d11 | | |
| 12 | −28.488 | 0.800 | 1.61800 | 63.39 |
| 13 | −103.518 | d13 | | |
| 14 | ∞ | 1.700 | | |
| 15* | 31.118 | 9.420 | 1.58930 | 60.60 |
| 16* | −39.857 | 2.423 | | |
| 17 | 52.653 | 6.660 | 1.49700 | 81.61 |
| 18 | −37.663 | 1.250 | 1.80518 | 25.46 |
| 19 | −581.1325 | d19 | | |
| 20* | −107.9348 | 1.300 | 1.69012 | 52.90 |
| 21* | 27.525027 | 1.911 | | |
| 22 | 43.799 | 2.378 | 1.76182 | 26.61 |
| 23 | 112.12613 | d23 | | |
| 24 | 27.512511 | 8.446 | 1.49700 | 81.61 |
| 25 | −50.62291 | 0.150 | | |
| 26 | 33.701 | 10.114 | 1.49700 | 81.61 |
| 27 | −23.534 | 1.427 | 1.80450 | 39.64 |
| 28 | 82.838 | 7.946 | | |
| 29* | −16.772 | 1.830 | 1.80470 | 40.90 |
| 30* | −35.811 | 0.150 | | |
| 31 | 200.000 | 3.119 | 1.92287 | 20.88 |
| 32 | −113.938 | d32 | | |
| 33 | ∞ | 3.000 | 1.51680 | 64.20 |
| 34 | ∞ | 0.500 | | |

TABLE 32

Zoom magnification 2.75

| | Wide angle position | Middle position | Telephoto position |
|---|---|---|---|
| Focal length | 24.697 | 32.000 | 67.800 |
| F value | 2.88 | 2.88 | 2.88 |
| Half field angle (°) | 43.08 | 35.18 | 17.43 |
| Image height | 21.640 | 21.640 | 21.640 |
| Lens total length | 143.659 | 144.391 | 174.243 |
| bF (in air) | 13.478 | 20.166 | 33.948 |
| d 5 | 0.832 | 1.563 | 31.414 |
| d 11 | 13.704 | 13.144 | 8.697 |
| d 13 | 13.144 | 7.626 | 1.400 |
| d 19 | 1.691 | 2.747 | 2.294 |
| d 23 | 6.287 | 4.621 | 1.967 |
| d 32 | 11.000 | 17.688 | 31.470 |

TABLE 33

| Surface number | K | a4 | a6 | a8 | a10 |
|---|---|---|---|---|---|
| 8 | 0 | 1.37691E−06 | −9.16323E−09 | 9.85642E−12 | 4.584915E−15 |
| 9 | 0 | −3.00342 E−06 | −1.11482 E−08 | 1.22395 E−11 | 5.07818 E−15 |
| 15 | 0 | −9.52799 E−06 | 2.21853 E−09 | −7.75711 E−12 | −5.78509 E−14 |
| 16 | 0 | 5.95549 E−06 | −1.03219 E−08 | 2.56292 E−11 | −8.42600 E−14 |
| 20 | 0 | −4.73359 E−06 | 8.98892 E−10 | 2.31699 E−11 | 2.95303 E−14 |
| 21 | 0 | −1.66308 E−05 | 1.58479 E−08 | −3.01592 E−11 | 7.96062 E−14 |
| 29 | 0 | 8.55082 E−06 | 1.50480 E−07 | −3.47328 E−10 | 2.33222 E−12 |
| 30 | 0 | 1.87881 E−05 | 7.52520 E−08 | −1.79735 E−10 | 2.51238 E−13 |

TABLE 34

| Formula | Seventh numerical embodiment |
|---|---|
| (1) | 1.966 |
| (2) | 0.829 |
| (3) | 81.607 |
| (4) | 0.764 |
| (5) | 1.933 |
| (6) | 0.274 |
| (7) | 2.576 |
| (8) | 0.032 |
| (9) | 1.546 |
| (10) | 0.600 |
| (11) | 1.841 |
| (12) | 0.721 |
| (13) | 0.416 |

TABLE 35

|  | Wide angle position | Telephoto position |
|---|---|---|
| Seventh numerical embodiment | 0.142 mm | 0.254 mm |

Figure 21:
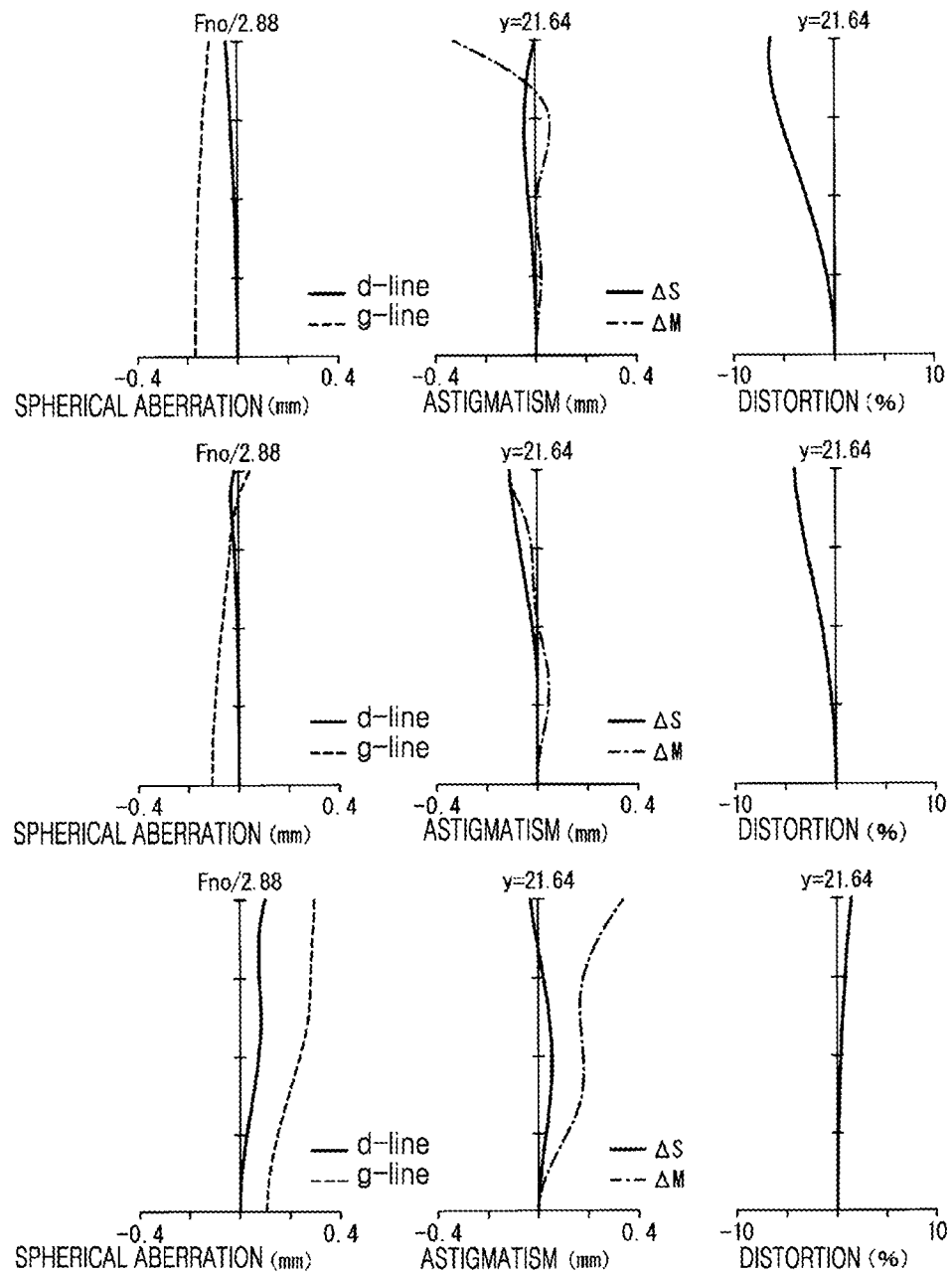
FIG. 21 illustrates spherical aberration, astigmatism, and distortion at the wide angle position W, the middle position M, and the telephoto position T in the zoom lens of the seventh numerical embodiment.
Figure 22A:
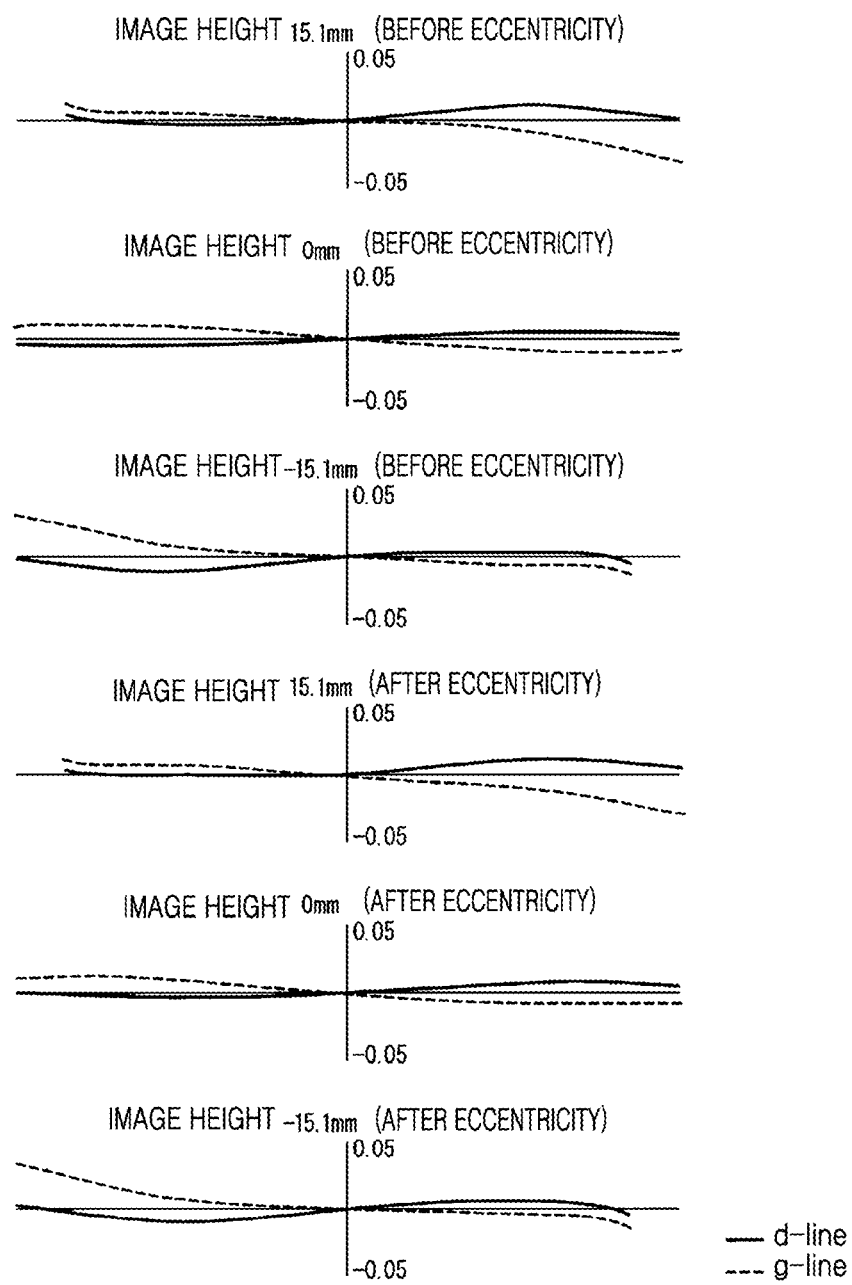
FIG. 22A illustrates lateral aberration at the wide angle position in the zoom lens of the seventh numerical embodiment.
Figure 22B:
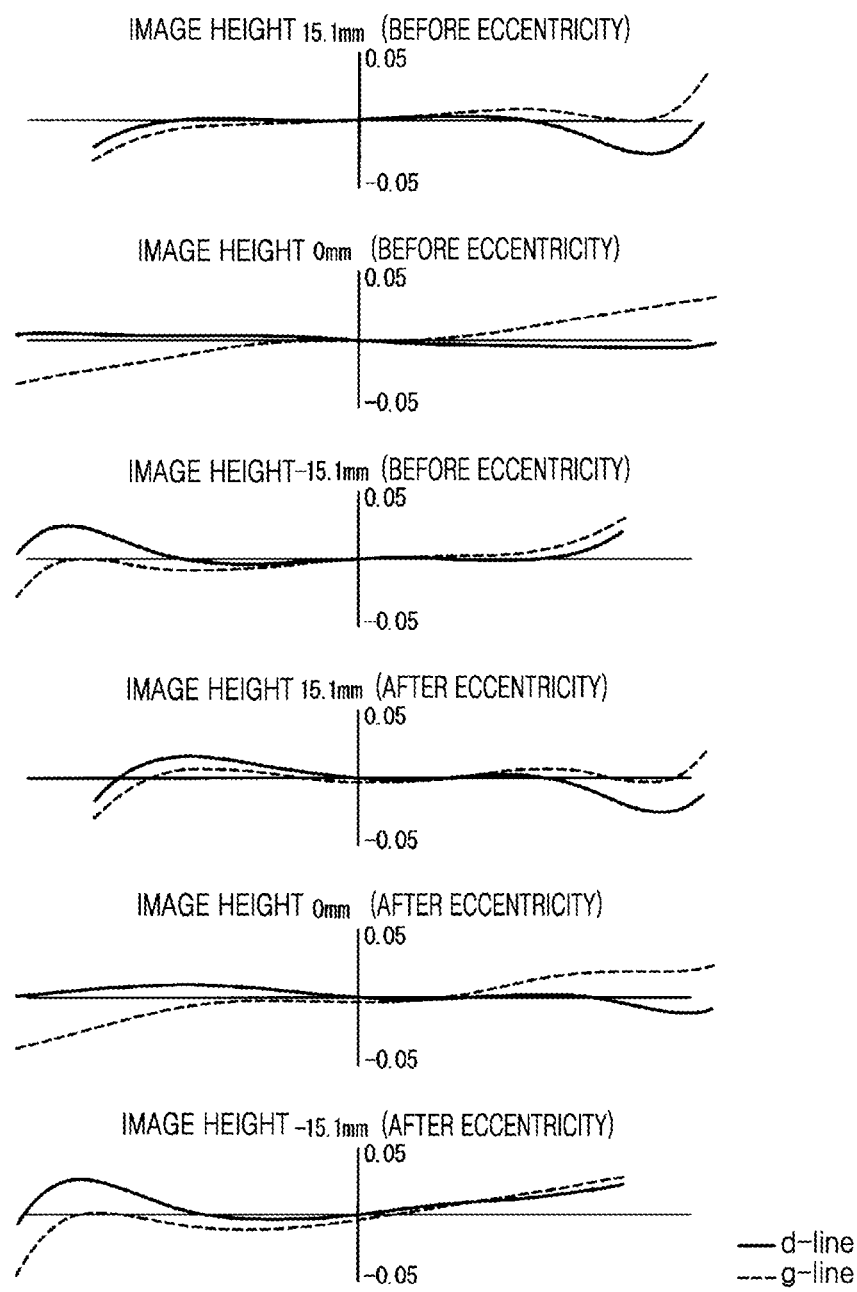
FIG. 22B illustrates lateral aberration at the telephoto position in the zoom lens of the seventh numerical embodiment.

Longitudinal aberration diagrams (each including a spherical aberration diagram, an astigmatism diagram, and a distortion diagram) of the zoom lens of the seventh numerical embodiment constructed as described above are illustrated in FIG. 21. Also, lateral aberration diagrams of the zoom lens of the seventh numerical embodiment at the wide angle position and the telephoto position are illustrated in FIGS. 22A and 22B. Also, the way in which FIGS. 21, 22A, and 22B are formed is the same as that used to form FIGS. 3, 4A, and 4B.

The zoom lens of the seventh numerical embodiment satisfies the above condition as shown in Tables 31 through 35. Also, it was found that in the zoom lens of the seventh numerical embodiment, each aberration was satisfactorily corrected as shown in FIGS. 21, 22A, and 22B.

Figure 23:
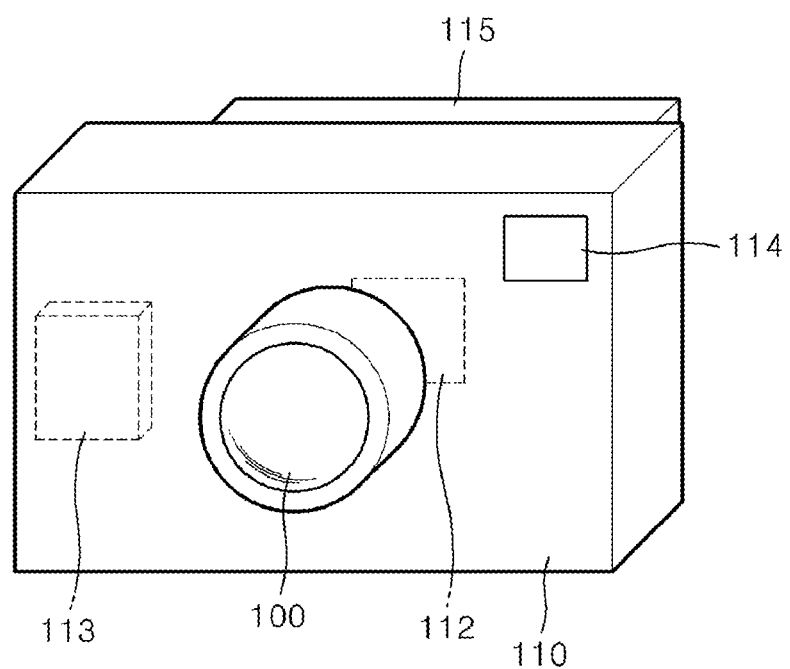
FIG. 23 is a perspective view of an imaging device including a zoom lens system, according to an embodiment of the present invention.

FIG. 23 illustrates an imaging device including a zoom lens system 100, according to an embodiment of the present invention. The zoom lens system 100 may include the zoom lens described according to the above embodiments. The imaging device includes an imaging element 112 for receiving light formed by the lens system 100 that is a telephoto lens system. The imaging device may include a recording means 113 on which information corresponding to an image of a subject obtained by photoelectric conversion of the imaging element 112 is recorded; and a view finder 114 for observing the image of the subject. Also, a display 115 on which the image of the subject is displayed may be provided. Although the view finder 114 and the display 115 are separately provided, the imaging device may include only the display 115 without the view finder 114. The imaging device of FIG. 23 is an example, and the present invention is not limited thereto and may be applied to any of various optical devices. As such, an optical device having a small volume may be realized by applying the zoom lens system according to an embodiment of the present invention to an imaging device such as a digital camera.

While the zoom lens and the imaging device have been particularly shown and described with reference to example embodiments thereof, they are provided for the purposes of illustration and it will be understood by one of ordinary skill in the art that various modifications and equivalent other embodiments can be made without departing from the spirit and the scope as defined by the following claims.

The invention claimed is:

1. A zoom lens comprising:
a first lens group having a positive refractive power;
a second lens group having a negative refractive power; and
a subsequent group comprising an aperture stop and a plurality of lens groups, and having a positive refractive power,
wherein the first lens group, the second lens group, and the subsequent group are sequentially arranged from an object side,
wherein an image plane lens group located closest to an image plane side from among the plurality of lens groups included in the subsequent group moves along an optical axis during zooming from a wide angle position to a telephoto position and comprises at least two positive lenses and at least two negative lenses, and the zoom lens satisfies the following formula:

$1.0 < f_r/f_w < 2.4$, wherein $f_r$ denotes a focal length of the image plane lens group and $f_w$ denotes a focal length of the zoom lens at the wide angle position, and
wherein the at least two positive lenses and the at least two negative lenses of the image plane lens group move together along the optical axis during zooming from the wide angle position to the telephoto position.

2. The zoom lens of claim 1,
wherein the image plane lens group comprises a first positive lens having two convex surfaces, a second positive lens having two convex surfaces, a negative lens having two concave surfaces, a negative lens having a shape convex toward the image plane side, and a positive lens having a shape convex toward the image plane side, and
wherein the first positive lens, the second positive lens, the negative lens having two concave surfaces, the negative lens having a shape convex toward the image plane side, and the positive lens are sequentially arranged from the object side.

3. The zoom lens of claim 1,
wherein at least one surface of one of the lenses constituting the image plane lens group is an aspherical surface, and wherein the aspherical surface of the one of the lenses of the image plane lens group moves together with the at least two positive lenses and the at least two negative lenses of the image plane lens group along the optical axis during zooming from the wide angle position to the telephoto position.

4. The zoom lens of claim 2, wherein the second positive lens and the negative lens having two concave surfaces are cemented together to form a double lens.

5. The zoom lens of claim 1, wherein when an amount of movement of the image plane lens group from the wide angle position to the telephoto position during zooming is $dr_{W-T}$ and a focal length of the zoom lens at the wide angle position is $f_w$, the zoom lens satisfies $0.6 < drw-T/f_w < 1.5.$ 6. The zoom lens of claim 4, wherein when an Abbe number of the first positive lens at a d-line (587.56 nm) is $v_{r1}$, a focal length of the first positive lens is $f_{r1}$, and a focal length of the image plane lens group is $f_r$, the zoom lens satisfies $60 < v_{r1},$ $0.4 < f_{r1}/f_r < 1.4.$ 7. The zoom lens of claim 1, wherein when a lens of the image plane lens group located closest to the image plane side is a positive lens having a shape convex toward the image plane side, a refractive index of the positive lens located closest to the image plane side at a d-line (587.56 nm) is $N_{rp}$, a paraxial radius of curvature of an object side surface of the positive lens located closest to the image plane side is $r_{rp1}$, and a paraxial radius of curvature of an image side surface of the positive lens located closest to the image plane side is $r_{rp2}$, the zoom lens satisfies $1.8 < N_{rp},$ $0.0 < (r_{rp1}+r_{rp2})/(r_{rp1}-r_{rp2}) < 5.0.$ 8. The zoom lens of claim 1, wherein a lens group located closest to the object side from among the plurality of lens groups constituting the subsequent group is located closer to the object side than the aperture stop, has a negative refractive power, and moves along the optical axis during focusing.

9. The zoom lens of claim 1, wherein the second lens group has a largest negative refractive power in the zoom lens and is fixed during zooming from the wide angle position to the telephoto position.

10. The zoom lens of claim 1,
wherein the subsequent group comprises a third lens group having a negative refractive power, a fourth lens group having a positive refractive power, a fifth lens group having a negative refractive power, and the image plane lens group having a positive refractive power, and
wherein the third lens group, the fourth lens group, the fifth lens group, and the image plane lens group are sequentially arranged from the object side.

11. The zoom lens of claim 10,
wherein when a focal length of the third lens group is $f_3$ and a focal length of the zoom lens at the wide angle position is $f_w$, the zoom lens satisfies $2.0 < |f_3/f_w| < 4.0.$ 12. The zoom lens of claim 10,
wherein the third lens group comprises one negative lens having a meniscus shape convex toward the image plane side, and
wherein when a thickness of the lens of the third lens group along the optical axis is $d_3$ and a focal length of the zoom lens at the wide angle position is $f_w$, the zoom lens satisfies $0.02 < d_3/f_w < 0.07.$ 13. The zoom lens of claim 10,
wherein at least one surface of any one of lenses constituting the second lens group is an aspherical surface, and
wherein when a focal length of the second lens group is $f_2$, a focal length of the third lens group is $f_3$, and a focal length of the zoom lens at the wide angle position is $f_w$, the zoom lens satisfies $1.2 < |f_2/f_w| < 2.4,$ $0.5 < f_2/f_3 < 1.2.$ 14. The zoom lens of claim 1,
wherein the first lens group comprises at least one positive lens and at least one negative lens, and
wherein when a focal length of the first lens group is $f_1$ and a focal length of the zoom lens at the telephoto position is $f_t$, the zoom lens satisfies $1.0 < f_1/f_t < 4.0.$ 15. The zoom lens of claim 10,
wherein the fifth lens group comprises at least one positive lens and at least one negative lens,
wherein blur is corrected by moving the fifth lens group within a plane intersecting the optical axis, and
wherein when a focal length of the fifth lens group is $f_5$ and a focal length of the zoom lens at the telephoto position is $f_t$, the zoom lens satisfies $0.2 < |f_5/f_t| < 2.0.$ 16. The zoom lens of claim 10,
wherein the fourth lens group comprises at least one positive lens and at least one negative lens,
wherein at least one surface of any one of lenses constituting the fourth lens group is an aspherical surface, and
wherein when a focal length of the fourth lens group is $f_4$ and a focal length of the zoom lens at the telephoto position is $f_t$, the zoom lens satisfies $0.2 < f_4/f_t < 0.6.$ 17. A zoom lens comprising:
a first lens group having a positive refractive power as a whole;
a second lens group having a negative refractive power as a whole; and
a subsequent group comprising an aperture stop and a plurality of lens groups including a third lens group and a fourth lens group,
wherein the subsequent group has a positive refractive power as a whole,
wherein the first lens group, the second lens group, and the subsequent group are sequentially arranged from an object side,
wherein zooming is performed by changing an air gap between lens groups,
wherein an image plane lens group located closest to an image plane side from among the plurality of lens groups constituting the subsequent group moves along an optical axis during zooming from a wide angle position to a telephoto position and comprises two positive lenses having two convex surfaces, a negative lens having two concave surfaces, a negative lens having a shape convex toward the image plane side, and a positive lens having a shape convex toward the image plane side, wherein at least one surface of any one of lenses constituting the image plane lens group located closest to the image plane side is an aspherical surface, and wherein the aperture stop moves integrally with the fourth lens group during zooming.

18. The zoom lens of claim 17, wherein the zoom lens satisfies $$1.0 < f_r/f_w < 2.4$$

where $f_r$ denotes a focal length of the image plane lens group and $f_w$ denotes a focal length of the zoom lens at the wide angle position.

19. The zoom lens of claim 17, wherein the subsequent group comprises the third lens group having a negative refractive power, the fourth lens group having a positive refractive power, a fifth lens group having a negative refractive power, and the image plane lens group having a positive refractive power, and wherein the third lens group, the fourth lens group, the fifth lens group, and the image plane lens group are sequentially arranged from the object side.

20. An imaging device comprising:

the zoom lens of claim 1; and a solid-state imaging device configured to capture an image formed by the zoom lens.

* * * * *